United States Patent
Pelletier et al.

(10) Patent No.: US 10,506,529 B2
(45) Date of Patent: Dec. 10, 2019

(54) METHOD AND APPARATUS FOR POWER SCALING FOR MULTI-CARRIER WIRELESS TERMINALS

(71) Applicant: InterDigital Patent Holdings, Inc., Wilmington, DE (US)

(72) Inventors: Benoit Pelletier, Montreal (CA); Diana Pani, Montreal (CA); Joseph S. Levy, Melville, NY (US); Fengjun Xi, San Diego, CA (US); Christopher R. Cave, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/613,742

(22) Filed: Jun. 5, 2017

(65) Prior Publication Data

US 2017/0273035 A1    Sep. 21, 2017

Related U.S. Application Data

(63) Continuation of application No. 14/230,929, filed on Mar. 31, 2014, now Pat. No. 9,706,504, which is a
(Continued)

(51) Int. Cl.
*H04L 5/00* (2006.01)
*H04W 52/14* (2009.01)
(Continued)

(52) U.S. Cl.
CPC ......... *H04W 52/325* (2013.01); *H04L 5/0007* (2013.01); *H04L 5/0021* (2013.01);
(Continued)

(58) Field of Classification Search
CPC . H04W 52/325; H04W 52/146; H04W 52/28; H04W 52/346; H04W 52/367;
(Continued)

(56) References Cited

U.S. PATENT DOCUMENTS

| 7,206,598 B2 | 4/2007 | Attar et al. |
| 7,444,162 B2 | 10/2008 | Hassan |

(Continued)

FOREIGN PATENT DOCUMENTS

| CN | 1716937 A | 1/2006 |
| CN | 1728585 A | 2/2006 |

(Continued)

OTHER PUBLICATIONS

Bergman et al., "Minutes from RAN1 adhoc session on DC-HSDPA MIMO, DC-HSUPA and TxAA extension for non-MIMO UEs, Seoul, Korea, Mar. 26, 2009," 3GPP TSG RAN WG1 Meeting #56bis, R1-091642 (Mar. 23-27, 2009).
(Continued)

*Primary Examiner* — Ian N Moore
*Assistant Examiner* — Brian T Le
(74) *Attorney, Agent, or Firm* — Volpe and Koenig, P.C.

(57) ABSTRACT

A wireless transmit/receive unit (WTRU) may determine transmission power levels for uplink channels for uplink component carriers. A transmission power level of a physical uplink shared channel (PUSCH) without control data may be scaled before a PUSCH with control data. A PUSCH without control data may be scaled before a physical uplink control channel (PUCCH) with control data. A secondary component carrier may be scaled before a primary component carrier.

6 Claims, 8 Drawing Sheets

Related U.S. Application Data continuation of application No. 12/766,400, filed on Apr. 23, 2010, now Pat. No. 8,700,084.

(60) Provisional application No. 61/172,109, filed on Apr. 23, 2009, provisional application No. 61/218,830, filed on Jun. 19, 2009, provisional application No. 61/235,803, filed on Aug. 21, 2009.

(51) Int. Cl.
| | | |
|---|---|---|
| *H04W 52/16* | (2009.01) | |
| *H04W 52/28* | (2009.01) | |
| *H04W 52/32* | (2009.01) | |
| *H04W 52/34* | (2009.01) | |
| *H04W 52/36* | (2009.01) | |

(52) U.S. Cl.
CPC ......... *H04W 52/146* (2013.01); *H04W 52/28* (2013.01); *H04W 52/346* (2013.01); *H04W 52/367* (2013.01); *H04W 52/16* (2013.01); *H04W 52/286* (2013.01)

(58) Field of Classification Search
CPC .. H04W 52/16; H04W 52/286; H04L 5/0007; H04L 5/0021
See application file for complete search history.

(56) References Cited

U.S. PATENT DOCUMENTS

| 7,447,516 | B2 | 11/2008 | Heo et al. |
| 7,734,262 | B2 | 6/2010 | Akbar Attar et al. |
| 7,782,899 | B2 | 8/2010 | Chen et al. |
| 8,295,779 | B2 | 10/2012 | Cave et al. |
| 8,346,178 | B2 | 1/2013 | Morita |
| 8,442,574 | B2 | 5/2013 | Kashiwase et al. |
| 8,700,084 | B2 | 4/2014 | Pelletier et al. |
| 2003/0058811 | A1 | 3/2003 | Shurvinton |
| 2006/0003787 | A1 | 1/2006 | Heo et al. |
| 2008/0186892 | A1 | 8/2008 | Damnjanovic |
| 2010/0246463 | A1* | 9/2010 | Papasakellariou et al. ................. G08C 17/00 370/311 |
| 2011/0292826 | A1* | 12/2011 | Ahn ...................... H04W 52/16 370/252 |
| 2012/0093011 | A1 | 4/2012 | Ranta-Aho et al. |

FOREIGN PATENT DOCUMENTS

| CN | 101170331 | 4/2008 |
| CN | 101170332 | 4/2008 |
| CN | 101222730 A | 7/2008 |
| EP | 1 793 509 | 6/2007 |
| JP | 2008-535339 | 8/2008 |
| WO | 06/103067 | 10/2006 |
| WO | 2008/082848 A1 | 7/2008 |
| WO | 10/089284 | 8/2010 |
| WO | 10/107360 | 9/2010 |

OTHER PUBLICATIONS

Ericsson et al., "DC-HSUPA—DPCCH power limit for secondary carrier," 3GPP TSG RAN WG1 Meeting #57bis, R1-092764 (Jun. 29-Jul. 3, 2009).
Ericsson et al., "Introduction of DC-HSUPA,"3GPP TSG-RAN WG1 Meeting #58bis, R1-094361, Miyazaki, Japan (Oct. 12-16, 2009).
Ericsson, "DC-HSUPA power scaling," 3GPP TSG RAN WG1 Meeting #57, R1-091894 (May 4-8, 2009).
Huawei, "Considerations on scheduling control for DC-HSUPA," 3GPP TSG RAN WG2 Meeting #65bis, R2-092470 (Mar. 23-27, 2009).
Interdigital Communication LLC, "Power scaling for data and control channel DC-HSUPA," 3GPP TSG-RAN WG1 Meeting #57, R1-092599 (Jun. 29-Jul. 3, 2009).
Interdigital Communication, LLC, "Dual Cell HSUPA," 3GPP TSG-RAN WG1 Meeting #57bis, R1-092600 (Jun. 29-Jul. 3, 2009).
Nokia et al., "Power scaling in dual carrier HSUPA," 3GPP TSG-RAN Working Group 1 (Radio) meeting #57, 3GPP TSG-RAN Working Group 1 (Radio) meeting #57 (May 4-8, 2009).
Nokia Siemens Networks et al., "Dual-Cell HSUPA," TSG-RAN Meeting #43, RP-090014 (Mar. 3-6, 2009).
Nokia Siemens Networks et al., "E-TFC selection for DC-HSUPA," 3GPP TSG-RAN WG2 Meeting 66, R2-093101 (May 4-8, 2009).
Nokia Siemens Networks et al., "PUSCH Power Control for LTE-Advanced," 3GPP TSG RAN WG1 #56-BIS Meeting, R1-091372 (Mar. 23-29, 2009).
Third Generation Partnership Project, "Technical Specification Group Radio Access Network; Requirements for support of radio resource management (FDD) (Release 9)," 3GPP TS 25.133 V9.3.0 (Mar. 2010).
Third Generation Partnership Project, "Technical Specification Group Radio Access Network; Requirements for support of radio resource management (FDD) (Release 8)," 3GPP TS 25.133 V8.6.0 (Mar. 2009).
Third Generation Partnership Project, "Technical Specification Group Radio Access Network; Requirements for support of radio resource management (FDD) (Release 8)," 3GPP TS 25.133 V8.10.0 (Mar. 2010).
Third Generation Partnership Project, "Technical Specification Group Radio Access Network; Physical layer procedures (FDD) (Release 8)," 3GPP TS 25.214 V8.5.0 (Mar. 2009).
Third Generation Partnership Project, "Technical Specification Group Radio Access Network; Physical layer procedures (FDD) (Release 8)," 3GPP TS 25.214 V8.9.0 (Mar. 2010).
Third Generation Partnership Project, "Technical Specification Group Radio Access Network; Physical layer procedures (FDD) (Release 9)," 3GPP TS 25.214 V9.2.0 (Mar. 2010).
Third Generation Partnership Project, "Technical Specification Group Radio Access Network; Physical layer procedures (FDD) (Release 8)," 3GPP TS 25.214 V7.11.0 (Mar. 2009).
Third Generation Partnership Project, Technical Specification Group Radio Access Network; Evolved Universal Terrestrial Radio Access (E-UTRA); Physical layer procedures (Release 8), 3GPP TS 36.213 V8.6.0 (Mar. 2009).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Physical layer procedures (Release 9)," 3GPP TS 36.213 V9.1.0 (Mar. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.8.0 (Mar. 2009).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.2.0 (Dec. 2009).
Ericsson et al., "Uplink Power Control for Carrier Aggregation," 3GPP TSG RAN WG1 Meeting #59bis, R1-100045, Valencia, Spain (Jan. 18-22, 2009).
Alcatel-Lucent et al., Summary of offline discussion on UL power control with CA, 3GPP TSG-RAN WG1 #60bis, R1-102573, Beijing, China (Apr. 12-16, 2010).

(56) References Cited

OTHER PUBLICATIONS

Nokia Siemens Networks et al., "Power reduction rule for uplink carrier aggregation," 3GPP TSG RAN WG1 #60bis Meeting, R1-101890, Beijing, China (Apr. 12-16, 2010).
Third Generation Partnership Project, "Technical Specification Group Radio Access Network; Evolved Universal Terrestrial Radio Access (E-UTRA); User Equipment (UE) radio transmission and reception (Release 8)," 3GPP TS 36.101 V8.5.1 (Mar. 2009).
Third Generation Partnership Project, "Technical Specification Group Radio Access Network; Evolved Universal Terrestrial Radio Access (E-UTRA); User Equipment (UE) radio transmission and reception (Release 8)," 3GPP TS 36.101 V8.9.0 (Mar. 2010).
Third Generation Partnership Project, "Technical Specification Group Radio Access Network; Evolved Universal Terrestrial Radio Access (E-UTRA); User Equipment (UE) radio transmission and reception (Release 9)," 3GPP TS 36.101 V9.3.0 (Mar. 2010).
Third Generation Partnership Project, "Technical Specification Group Radio Access Network; Evolved Universal Terrestrial Radio Access (E-UTRA); Physical layer—Measurements (Release 8)," 3GPP TS 36.214 V8.6.0 (Mar. 2009).
Third Generation Partnership Project, "Technical Specification Group Radio Access Network; Evolved Universal Terrestrial Radio Access (E-UTRA); Physical layer—Measurements (Release 8)," 3GPP TS 36.214 V8.7.0 (Sep. 2009).
Third Generation Partnership Project, "Technical Specification Group Radio Access Network; Evolved Universal Terrestrial Radio Access (E-UTRA); Physical layer; Measurements (Release 9)," 3GPP TS 36.214 V9.1.0 (Mar. 2010).

\* cited by examiner

METHOD AND APPARATUS FOR POWER SCALING FOR MULTI-CARRIER WIRELESS TERMINALS

CROSS REFERENCE TO RELATED APPLICATIONS

This application is a continuation of U.S. patent application Ser. No. 14/230,929, filed Mar. 31, 2014, which is a continuation of U.S. patent application Ser. No. 12/766,400, filed Apr. 23, 2010, which issued as U.S. Pat. No. 8,700,084 on Apr. 15, 2014, which claims the benefit of U.S. provisional application No. 61/172,109 filed Apr. 23, 2009; U.S. provisional application No. 61/218,830 filed Jun. 19, 2009; and U.S. provisional application No. 61/235,803 filed Aug. 21, 2009, the contents of which are hereby incorporated by reference herein.

BACKGROUND

Radio transmitters are generally limited in total transmit power, a limit imposed by regulatory agencies or by the battery or power amplifier technology. This power limitation may result in reduced radio coverage. For example, as a wireless transmit/receive unit (WTRU) moves away from its base station, it typically increases its transmission power to maintain the same level of quality at the base station. The WTRU output power is controlled by the base station via a power control loop. When the WTRU reaches its maximum power and may no longer increase its power to maintain the signal quality desired at the base station, power scaling is applied. This may occur for example when the WTRU is close to cell-edge, or when the WTRU enters a region of deep signal fade.

Wireless communication systems keep evolving to meet the needs for providing continuous and faster access to a data network. In order to meet these needs, wireless communication systems may use multiple carriers for the transmission of data. A wireless communication system that uses multiple carriers for the transmission of data may be referred to as a multi-carrier system. The use of multiple carriers is expanding in both cellular and non-cellular wireless systems.

A multi-carrier system may increase the bandwidth available in a wireless communication system according to a multiple of how many carriers are made available. For instance, a dual carrier system may double the bandwidth as compared to a single carrier system and a tri-carrier system may triple the bandwidth as compared to a single carrier system and so on. In multi-carrier systems, the WTRU may transmit, for example, over two adjacent carriers. A power amplifier may be assumed to be common to the multiple carriers such that the total power is a shared resource between the multiple carriers. Methods and apparatus for power scaling for multi-carrier wireless terminals are desired.

SUMMARY

Methods and apparatus for power scaling for multi-carrier wireless terminals are disclosed. Methods and mechanisms are provided for power scaling when a multi-carrier WTRU reaches its maximum output power.

BRIEF DESCRIPTION OF THE DRAWINGS

A more detailed understanding may be had from the following description, given by way of example in conjunction with the accompanying drawings wherein.

DETAILED DESCRIPTION

Figure 1:
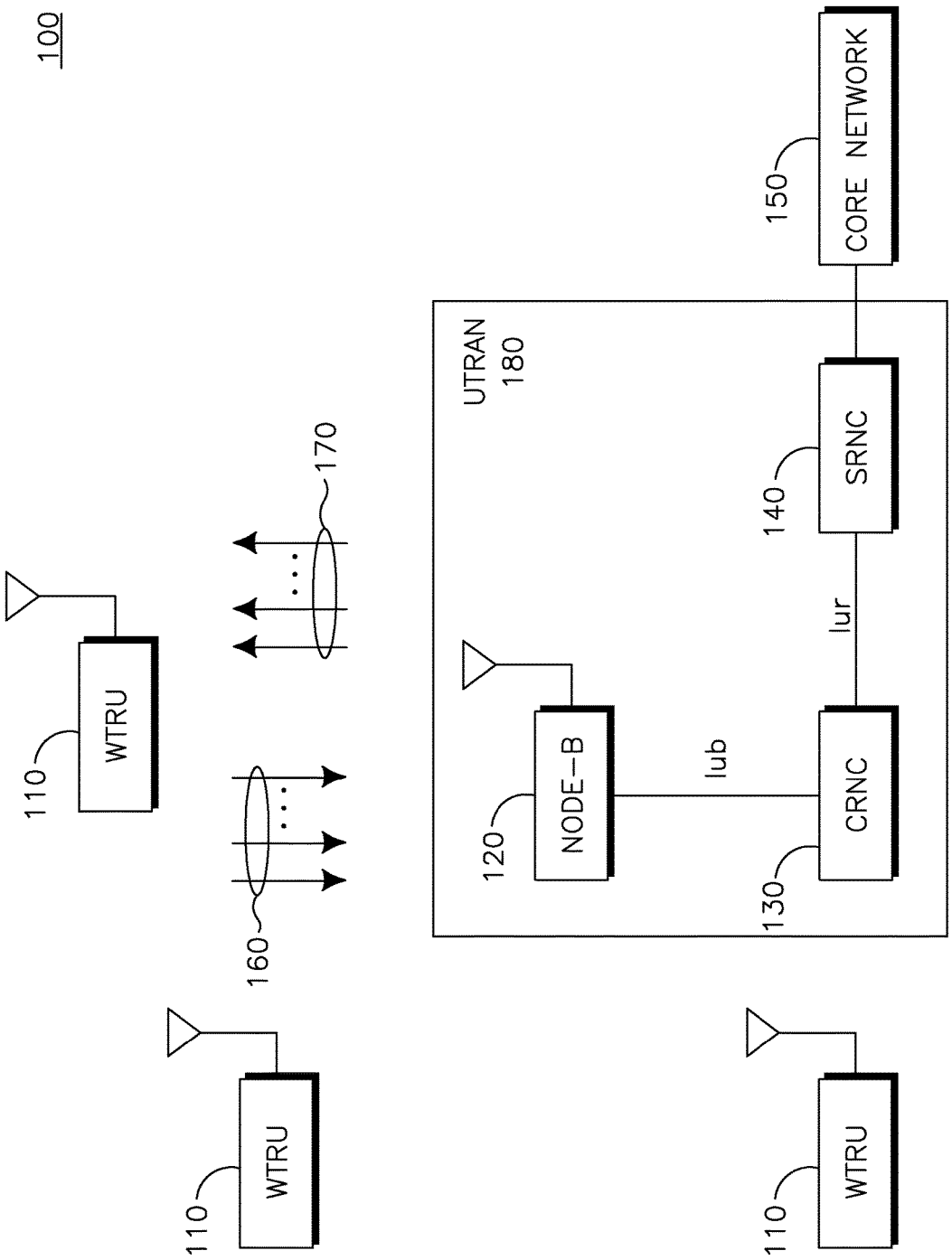
FIG. 1 shows an example wireless communication system including a plurality of wireless transmit/receive units (WTRUs), a Node-B, a controlling radio network controller (CRNC), a serving radio network controller (SRNC), and a core network.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of device capable of operating in a wireless environment. When referred to hereafter, the terminology "base station" includes but is not limited to a Node-B, a site controller, an access point (AP), or any other type of interfacing device capable of operating in a wireless environment.

Multiple uplink and downlink carriers may be configured for the WTRU. The multiple carriers may or may not be adjacent and may or may not be on the same frequency or radio band and/or range of frequencies. In one embodiment, the multiple carriers may include, but are not limited to, four downlink carriers adjacent in the same band with one or two uplink carriers in the same band. In another embodiment, the multiple carriers may include, but are not limited to, two pairs of two adjacent downlink carriers over two different bands and two uplink carriers in the respective bands. In yet another embodiment, the multiple carriers may include, but are not limited to, three adjacent downlink carriers in the same band with one or two (adjacent) uplink carriers also in the same band. Multiple uplink and downlink carriers may also be configured to operate in symmetric and asymmetric configurations with respect to carrier size and the number of carriers. Carriers may also be referred to as component carriers.

In general, the network may assign at least one downlink and/or at least one uplink carrier as an anchor downlink carrier and an anchor uplink carrier, respectively. In multi-carrier operation, a WTRU may be configured to operate with two or more carriers. Carriers may also be referred to as, or by, frequencies. Each of these carriers may have distinct characteristics and logical associations with the network and the WTRU, and the operating frequencies may be grouped and referred to as an anchor or primary carrier and a supplementary or secondary carrier. If more than two carriers are configured, the WTRU may have or be configured to receive more than one primary carrier and/or more than one secondary carrier(s). For example, the anchor carrier may be defined as the carrier for carrying a specific set of control information for downlink/uplink transmissions. Any carrier that is not assigned as an anchor carrier may be a supplementary carrier. Alternatively, the network may not assign an anchor carrier and no priority, preference, or default status may be given to any downlink or uplink carriers. Hereinafter, the terms "anchor carrier", "primary carrier", "uplink carrier 1", "first carrier", and "first uplink carrier", are used interchangeably herein for convenience. Similarly, the terms "supplementary carrier", "secondary carrier", "uplink carrier 2", "second carrier", and "second uplink carrier" are also used interchangeably herein. Although the term "uplink" is used, the term "downlink" is equally applicable. For multi-carrier operation, more than one supplementary carrier or secondary carrier may exist.

The terminology "anchor carrier" may refer to the downlink frequency carrier associated with an uplink frequency carrier assigned to the WTRU, and the terminology "supplementary carrier" may refer to the downlink frequency carrier which is not the anchor carrier. The uplink "anchor" carrier may refer to the uplink carrier associated with the downlink anchor carrier either via explicit configuration or by implicit association via the specific uplink/downlink carrier spacing.

The term downlink "anchor" carrier may refer to the downlink carrier carrying downlink control channels such as, but not limited to, a fractional dedicated physical channel (F-DPCH) (shown in FIG. 5), an enhanced-absolute grant channel (E-AGCH), physical downlink control channel (PDCCH) and other such channels. Other physical channels such as the common pilot channel (CPICH), high-speed shared control channel (HS-SCCH) and high-speed physical downlink shared channel (HS-PDSCH) may be read from any downlink carrier, such as the supplementary or secondary carriers. When more than one downlink carrier carries downlink control channels associated with one or more uplink carriers, the downlink "anchor" carrier may refer to a downlink carrier configured with an "anchor" carrier attribute. Alternatively, the term downlink "anchor" carrier may refer to the downlink carrier on which a serving high-speed downlink shared channel (HS-DSCH) cell is transmitted. Optionally, if a single downlink carrier is configured for the WTRU, then it may be the primary downlink carrier.

The term uplink "anchor" carrier may refer to the uplink carrier over which the HS-DPCCH is transmitted. Alternatively, it may refer to the carrier over which the DPDCH is transmitted, if configured. In another embodiment, it may refer to the carrier over which the Signaling Radio Bearers (SRBs) or other dedicated control messages are carried. In yet another embodiment, the anchor carrier may be the uplink carrier associated with the downlink anchor carrier, e.g., the serving HS-DSCH cell. Although SRBs may be used as an example of a dedicated control message in the description, SRBs may also equivalently refer to other dedicated control messages or any higher priority messages that may be carried on the physical data channel.

Embodiments described herein provide several approaches for implementing power scaling for uplink transmissions across multiple uplink carriers. Embodiments described herein are applicable to any number of uplink carriers. In general, the embodiments described herein are applicable to WTRUs where power may be shared across all carriers or a subset of carriers or a maximum total power constraint across all carriers or a subset of carriers are imposed. For example, but not limited to, it may be applicable to WTRUs having a single power amplifier that is shared among multiple carriers.

FIG. 1 shows an example wireless communications system 100 where uplink transmissions are handled using multiple carriers 160 and downlink transmissions are handled using multiple carriers 170. The wireless communication system 100 includes a plurality of WTRUs 110, a Node-B 120, a CRNC 130, a SRNC 140, and a core network 150. The Node-B 120 and the CRNC 130 may collectively be referred to as the UTRAN 180.

As shown in FIG. 1, the WTRUs 110 are in communication with the Node-B 120, which is in communication with the CRNC 130 and the SRNC 140. Although three WTRUs 110, one Node-B 120, one CRNC 130, and one SRNC 140 are shown in FIG. 1, it should be noted that any combination of wireless and wired devices may be included in the wireless communication system 100.

Figure 2:
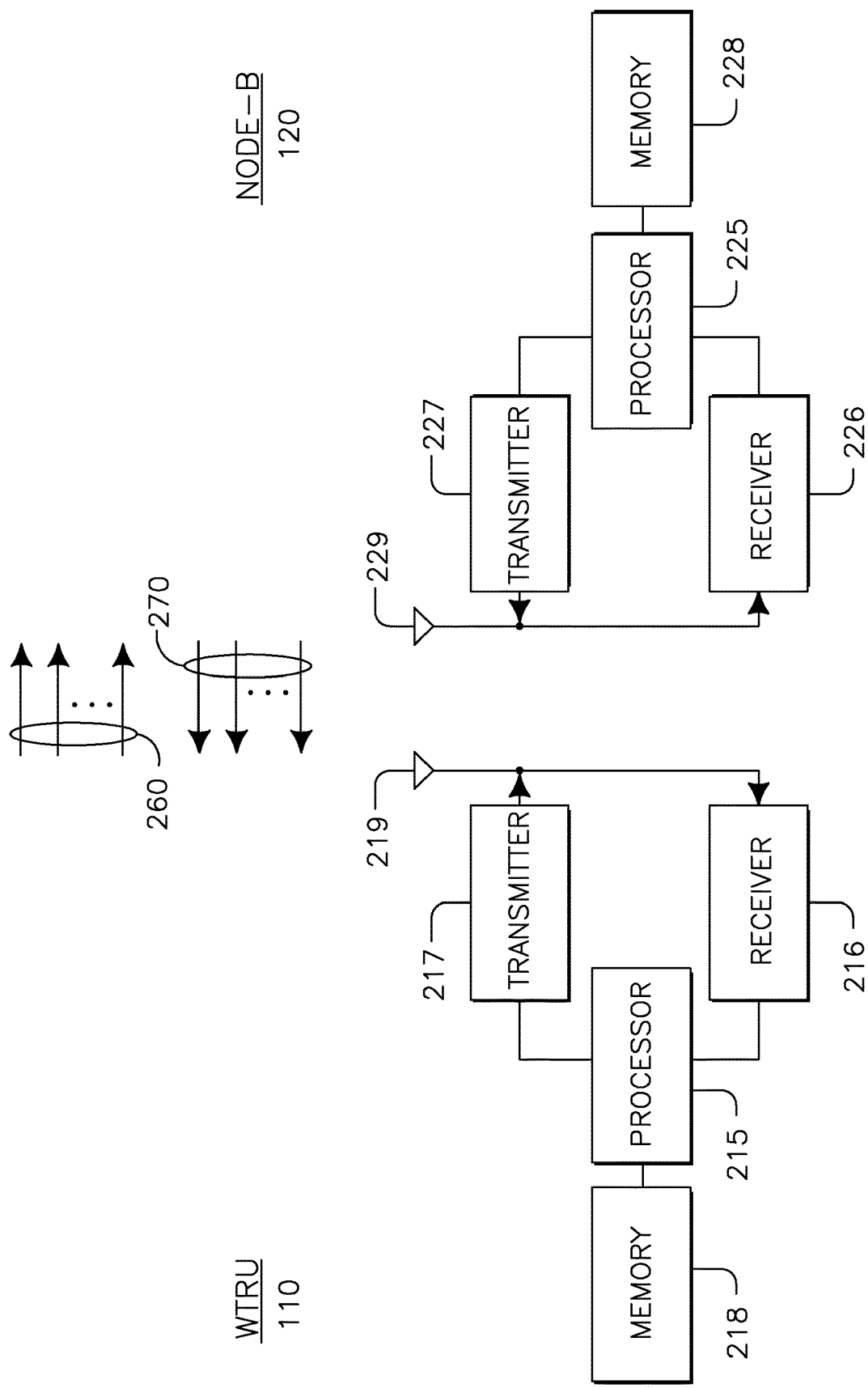
FIG. 2 shows example functional block diagrams of the WTRU and the Node-B of the wireless communication system of FIG. 1.

FIG. 2 is a functional block diagram of the WTRU 110 and the Node-B 120 of the wireless communication system 100 of FIG. 1. As shown in FIG. 2, the WTRU 110 is in communication with the Node-B 120 using multiple uplink carriers 260 and multiple downlink carriers 270. WTRU 110 and Node-B 120 are configured to perform a method of power scaling on multiple uplink carriers.

The WTRU 110 includes a processor 215, a receiver 216, a transmitter 217, a memory 218, an antenna 219, and other components (not shown) that may be found in a typical WTRU. The antenna 219 may include a plurality of antenna elements or a plurality of antennas may be included in the WTRU 110. The memory 218 is provided to store software including operating system, application, and other modules or components. The processor 215 is provided to perform, alone or in association with software and/or any one or more of the components, a method wherein uplink transmissions from the WTRU 110 are transmitted to the Node-B 120 using multiple uplink carriers in accordance with the power scaling examples described herein. The receiver 216 and the transmitter 217 are in communication with the processor 215. The receiver 216 and the transmitter 217 are capable of receiving and transmitting one or more carriers simultaneously. Alternatively, multiple receivers and/or multiple transmitters may be included in the WTRU 110. The antenna 219 is in communication with both the receiver 216 and the transmitter 217 to facilitate the transmission and reception of wireless data.

The Node B 120 includes a processor 225, a receiver 226, a transmitter 227, a memory 228, an antenna 229, and other components (not shown) that may be found in a typical base station. The antenna 229 may include a plurality of antenna elements or a plurality of antennas may be included in the Node B 220. The memory 228 is provided to store software including operating system, application, and other modules or components. The processor 225 is provided to perform, alone or in association with software and/or any one or more of the components, a method wherein uplink transmissions from the WTRU 110 are transmitted to the Node-B 120 using multiple uplink carriers in accordance with the power scaling examples described herein. The receiver 226 and the transmitter 227 are in communication with the processor 225. The receiver 226 and the transmitter 227 are capable of receiving and transmitting one or more carriers simultaneously. Alternatively, multiple receivers and/or multiple transmitters may be included in the Node B 220. The antenna 229 is in communication with both the receiver 226 and the transmitter 227 to facilitate the transmission and reception of wireless data.

Figure 3:
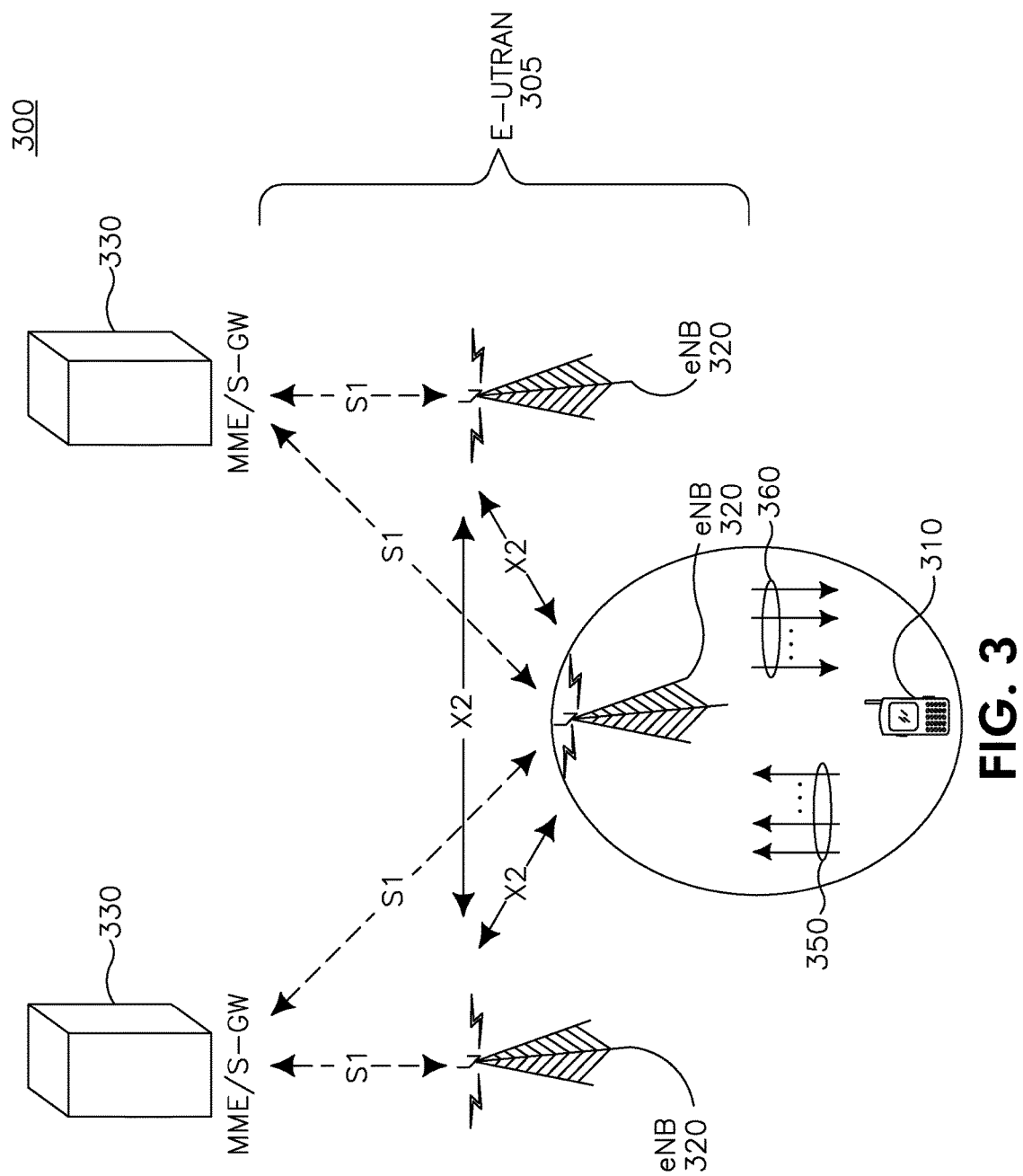
FIG. 3 shows an example wireless communication system/access network of long term evolution (LTE)

FIG. 3 shows another example wireless communications system 300 where uplink transmissions are handled using multiple uplink carriers 350 and downlink transmissions are handled using multiple downlink carriers 360. In particular, FIG. 3 shows a Long Term Evolution (LTE) wireless communication system/access network 300 that includes an Evolved-Universal Terrestrial Radio Access Network (E-UTRAN) 305. The E-UTRAN 305 includes a WTRU 310 and several evolved Node-Bs, (eNBs) 320. The WTRU 310 is in communication with an eNB 320. The WTRU 310 and eNB 320 may communicate using uplink component carriers 350 and downlink component carriers 360. The eNBs 320 interface with each other using an X2 interface. Each of the eNBs 320 interface with a Mobility Management Entity (MME)/Serving GateWay (S-GW) 330 through an S1 interface. Although a single WTRU 310 and three eNBs 320 are shown in FIG. 3, it should be apparent that any combination of wireless and wired devices may be included in the wireless communication system access network 300.

Figure 4:
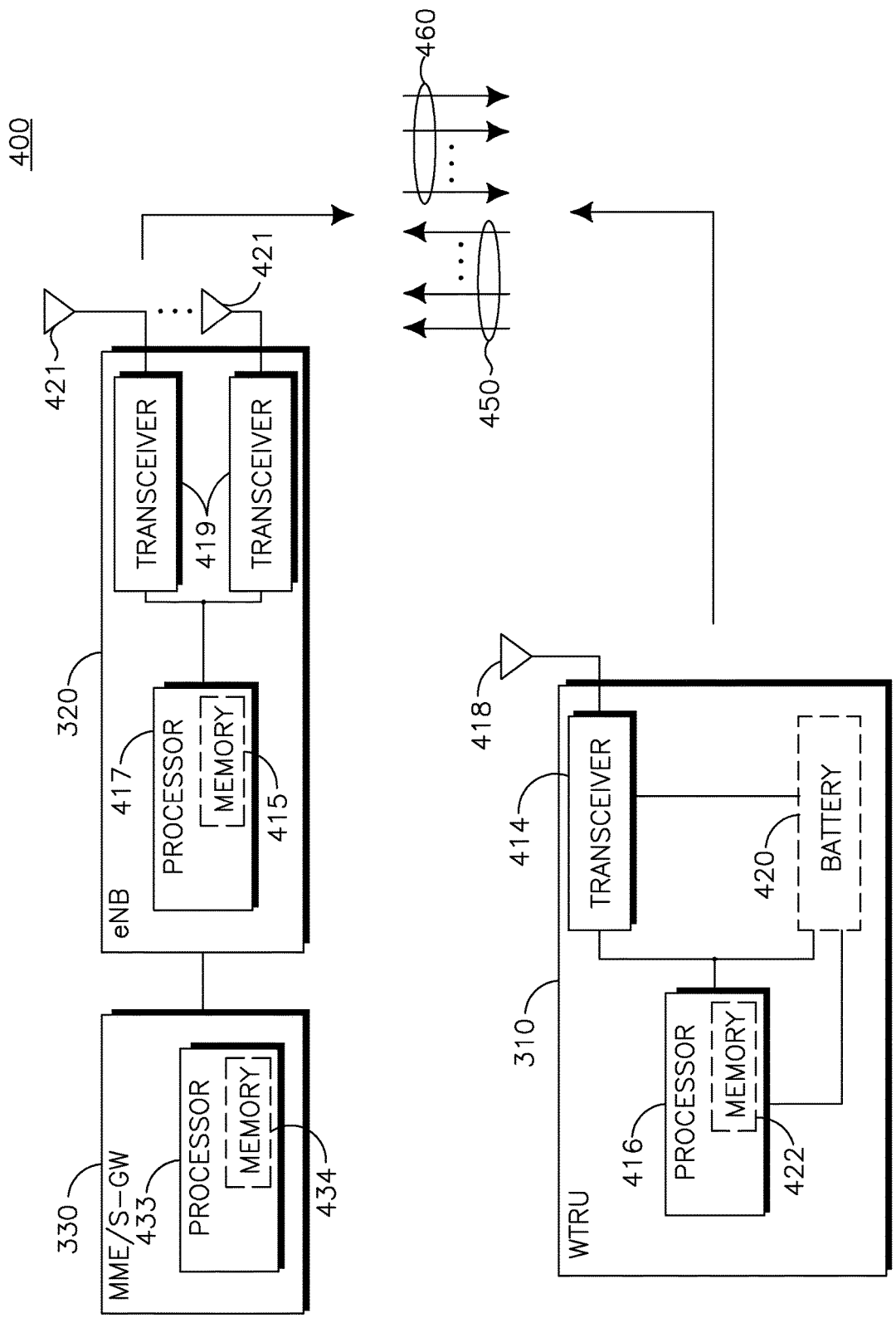
FIG. 4 shows example block diagrams of a WTRU and a base station of the LTE wireless communication system of FIG. 3.

FIG. 4 is an example block diagram of an LTE wireless communication system 300 including the WTRU 310, the eNB 320, and the MME/S-GW 330. As shown in FIG. 4, the WTRU 310 is in communication with the eNB 320 and both are configured such that uplink transmissions from the WTRU 310 are transmitted to the eNB 320 using multiple carriers 450, and downlink transmissions from the eNB 320 are transmitted to the WTRU 310 using multiple downlink carriers 460. The WTRU 310, the eNB 320 and the MME/S-GW 330 are configured to perform a method of power scaling on multiple uplink carriers.

In addition to the components that may be found in a typical WTRU, the WTRU 310 includes a processor 416 with an optional linked memory 422, at least one transceiver 414, an optional battery 420, and an antenna 418. The processor 416 is configured for power scaling on multiple uplink carriers. The transceiver 414 is in communication with the processor 416 and the antenna 418 to facilitate the transmission and reception of wireless communications. In case a battery 420 is used in the WTRU 310, it powers the transceiver 414 and the processor 416.

In addition to the components that may be found in a typical eNB, the eNB 320 includes a processor 417 with an optional linked memory 415, transceivers 419, and antennas 421. The processor 417 is configured to perform power scaling on multiple uplink carriers. The transceivers 419 are in communication with the processor 417 and antennas 421 to facilitate the transmission and reception of wireless communications. The eNB 320 is connected to the Mobility Management Entity/Serving GateWay (MME/S-GW) 330 which includes a processor 433 with an optional linked memory 434.

A Wideband Code Division Multiple Access (WCDMA) Frequency Division Duplex (FDD) WTRU transmits both data and control channels simultaneously using code division multiple access. In WCDMA FDD, the power of every channel is dependent on a power offset relative to the power of the Dedicated Physical Control Channel (DPCCH). The power of the DPCCH is controlled by base stations on the active set such that a certain level of quality is reached. Typically, the power ratio for the control channels are configured by the network, whereas the power ratios for the data channels are also determined based on the transmitted data rate.

Power scaling for WTRUs may depend, for example, on whether Enhanced Dedicated Channel (E-DCH) is configured. For the case where the E-DCH is not configured, and the total WTRU transmit power after applying the DPCCH power adjustments and gain factor may exceed the maximum allowed value, the WTRU may apply additional scaling to the total transmit power so that it is equal to the maximum allowed power. This additional scaling may be such that the power ratio between DPCCH and Dedicated Physical Data Channel (DPDCH) and DPCCH and High Speed Dedicated Physical Control Channel (HS-DPCCH) is maintained as required. Thus when the E-DCH is not configured, the power scaling mechanism maintains the power ratio between the different channels.

For the case where the E-DCH is configured, the rule is different. The WTRU may first reduce all the E-DCH Dedicated Physical Data Channel (E-DPDCH) gain factors, $\beta_{ed,k}$, by an equal scaling factor to respective values, $\beta_{ed,k,reduced}$, so that the total transmit power may be equal to the maximum allowed power. In case no DPDCH is configured and regardless of the applied uplink modulation, if any $\beta_{ed,k,reduced}/\beta_c$ is less than $\beta_{ed,k,reduced,min}/\beta_c$, then $\beta_{ed,k}$ shall be set to $\beta_{ed,k,min}$ such that $\beta_{ed,k,min}/\beta_c$=min $(\beta_{ed,k,reduced,min}/\beta_c, \beta_{ed,k,original}/\beta_c)$, where $\beta_{ed,k,original}$ denotes the E-DPDCH gain factor before reduction and $\beta_{ed,k,reduced,min}$ is configurable by higher layers.

The WTRU may then apply additional power scaling to the total transmit power so that it is equal to the maximum allowed power in certain cases. Power scaling may be applied if the DPDCH is configured and the total WTRU transmit power would still exceed the maximum allowed value even though discontinuous transmission (DTX) is used on all the E-DPDCHs. It may also be applied if no DPDCH is configured and the total WTRU transmit power would still exceed the maximum allowed value even though $\beta_{ed,k}$ is equal to $\beta_{ed,k,min}$ for all k.

Any additional power scaling of the total transmit power shall be such that the power ratio between the DPCCH and the DPDCH, between the DPCCH and the HS-DPCCH, and between the DPCCH and the E-DPCCH, is maintained as required and such that the power ratio between each E-DPDCH and DPCCH remains as required by $\beta_{ed,k,min}/\beta_c$ if DTX is not used on the E-DPDCH.

The rules for power scaling ensure that power is devoted to the control channels and the data channels carrying dedicated control messages such as the Signaling Radio Bearers (SRBs). When the DPDCH and the E-DCH are configured, the WTRU may reduce the power of the E-DCH completely before applying power scaling equally to all other channels. In short, this approach allows the SRBs mapped to the DPDCH to be transmitted at the proper power at the expense of the E-DCH. When there is no DPDCH, the SRBs are necessarily mapped to the E-DCH and for this reason a minimum power ratio $\beta_{ed,k,reduced,min}$ is provided to the E-DCH. DTX will not be applied to the E-DCH in this case.

Figure 5:
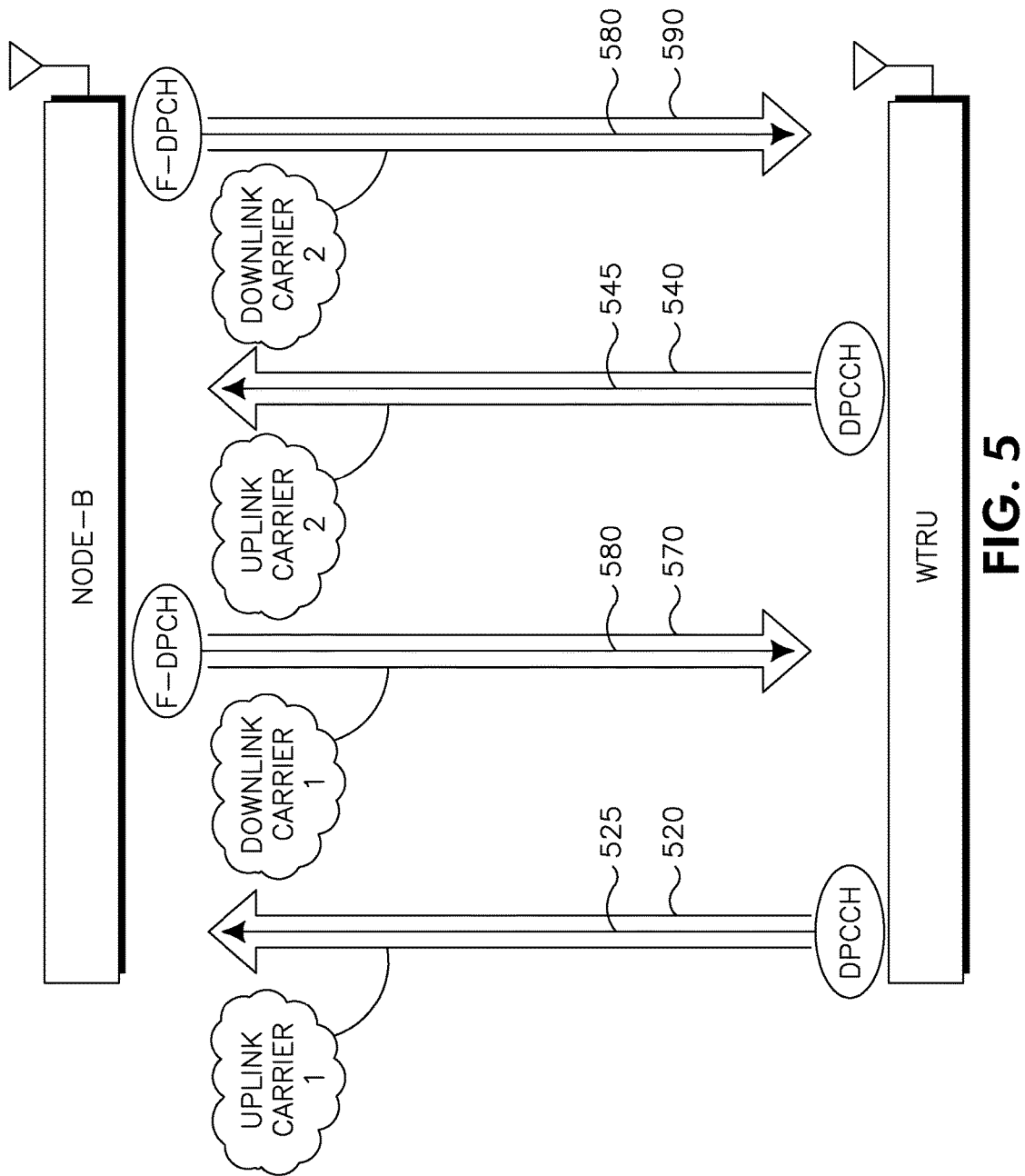
FIG. 5 shows an example of wireless communications using multiple carriers.

Referring now to FIG. 5, there is shown a Node B 505 and WTRU 510 communicating using multiple uplink carriers 520 and 540 and multiple downlink carriers 570 and 590. The multiple downlink carriers 570 and 590 may carry certain power information from the Node B 510 to the WTRU 505. The power scaling examples described herein may be used in conjunction with the dedicated physical control channel (DPCCHs) 525 and 545 carried by uplink carriers 520 and 540, respectively. Moreover, the power scaling examples may be applied to the Enhanced Dedicated Channels (E-DCH) Dedicated Physical Data Control Channel (E-DPDCH) carried by the uplink carriers 520 and 540, respectively. It is noted that while specific channels are shown being carried by uplink and downlink carriers in the figures shown herein, any applicable channel may be carried in such carriers. Alternatively, the power scaling examples described herein may be used in conjunction with a physical uplink control channel (PUCCH) and may be applied to a physical uplink shared channel (PUSCH). The PUSCH(s) may be carried on uplink carriers 520 and 540.

It is also noted that although the embodiments described herein are described with reference to channels associated with Third Generation Partnership Program (3GPP) Releases 4 through 9, it should be noted that the embodiments are applicable to further 3GPP releases (and the channels used therein) such as LTE Release 10 as well as any other type of wireless communication system, and the channels used therein. It should also be noted that the embodiments described herein may be applicable in any order or in any combination. While embodiments may be described in the context of 3GPP Wideband Code Division Multiple Access (WCDMA) Frequency Division Duplex (FDD), the description herein may be applicable to other wireless technologies. Likewise, where the embodiments are described in the context of dual-carrier uplink operations, the description may be extended to support multi-carrier uplink operations which use, for example, simultaneous transmission of data and control channels.

When referred to hereafter, the terminology "maximum power limit" may refer to one or a combination of the following illustrative meanings. Maximum power limit may refer to the maximum power over all or a subset of carriers as defined by the WTRU category. It may alternatively refer to the maximum power over all or a subset of carriers as configured by the network. This may be smaller than or equal to the maximum power over all or a subset of carriers as defined by the WTRU category. It may also refer to the sum of the maximum power configured by the network for each of the carriers or group of carriers. The maximum powers for each of the carriers may or may not be the same.

The power scaling methods and approaches for dual-carrier and multi-carrier operations described herein may be used in any order and combination. While the example methods may be described in terms of power, the examples may equivalently be described in terms of amplitude or gain factors. While the example methods may be described with respect to DPCCH, E-DPDCH, PUCCH, PUSCH and other illustrative channels, the examples are also applicable to control and data channels in general. Unless specified otherwise, the proposed methods for power scaling apply when the WTRU is configured for dual-carrier or multi-carrier operations and more than one carrier is being transmitted by the WTRU.

Figure 6A:
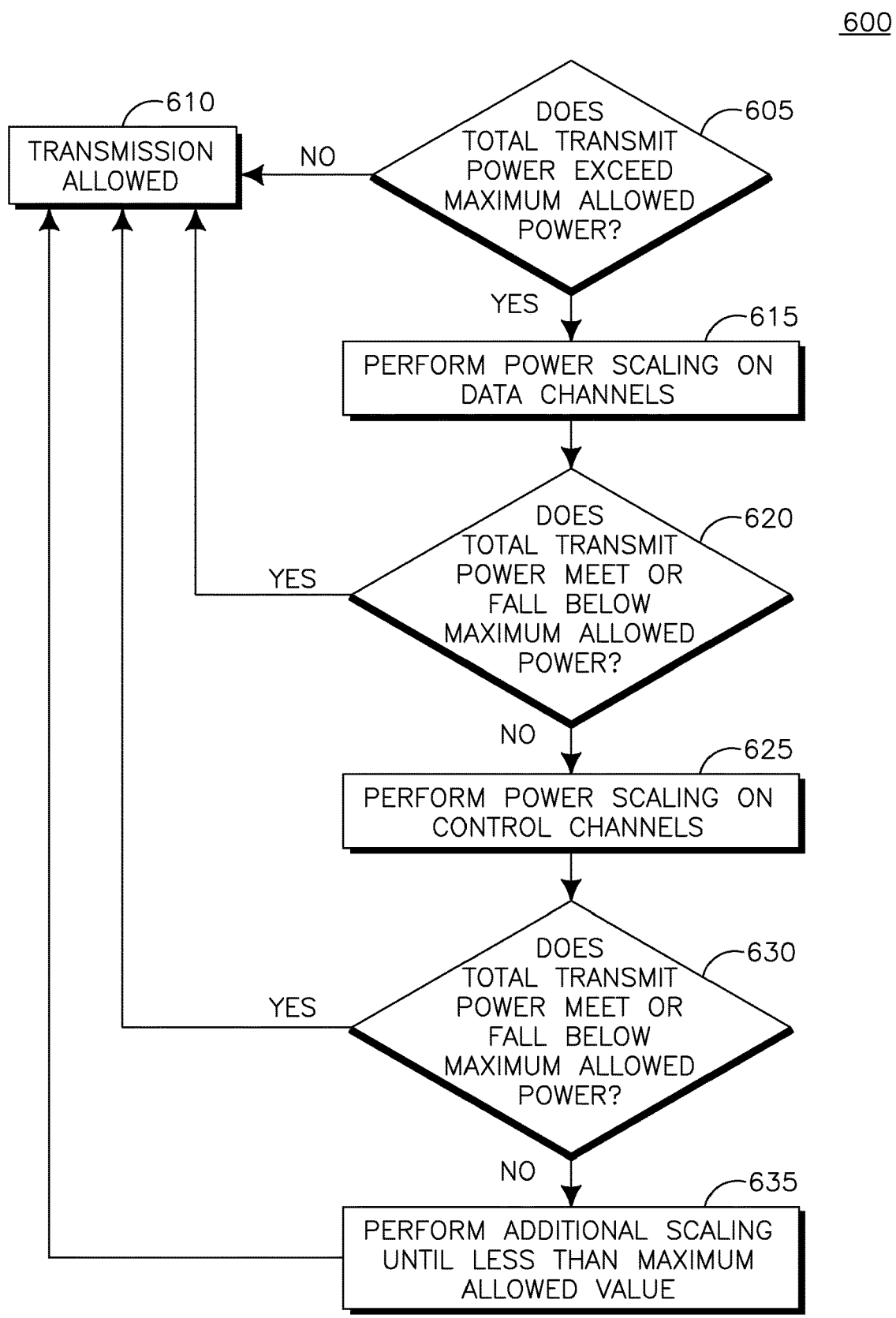
FIG. 6A shows an example flowchart for power scaling for multi-carrier WTRUs.

In general, as shown in FIG. 6A, the WTRU may execute the following procedure. If the total WTRU transmit power (the WTRU transmit power may correspond to the power after applying DPCCH power adjustments and gain factor as an example) does not exceed the maximum allowed value (605) then transmission is allowed (610). If the total WTRU transmit power exceeds the maximum allowed value, then the WTRU performs power scaling on a group channels in accordance with a rule or criteria until the total WTRU transmit power no longer exceeds the maximum allowed value or minimum transit power levels are reached (615). For example, the group of channels may be data channels as shown in FIG. 6A. The group of channels may include channels carrying user information (e.g., E-DCH) and optionally include associated control channels (e.g., E-DPCCH). If the total WTRU transmit power does not exceed the maximum power value (620), then transmission is allowed (610). If the total WTRU transmit power exceeds the maximum allowed value, then the WTRU may need to perform power scaling on another group of channels under certain conditions as described herein (625). For example, this other group of channels may be control channels as shown in FIG. 6A. If the total WTRU power does not exceed the maximum allowed value (630), then transmission is allowed (610). If the total WTRU transmit power still exceeds the maximum allowed value (630), then the WTRU may need to perform additional power scaling (635). FIG. 6A is illustrative and the WTRU may perform power scaling in any order and in any combination.

Figure 6B:
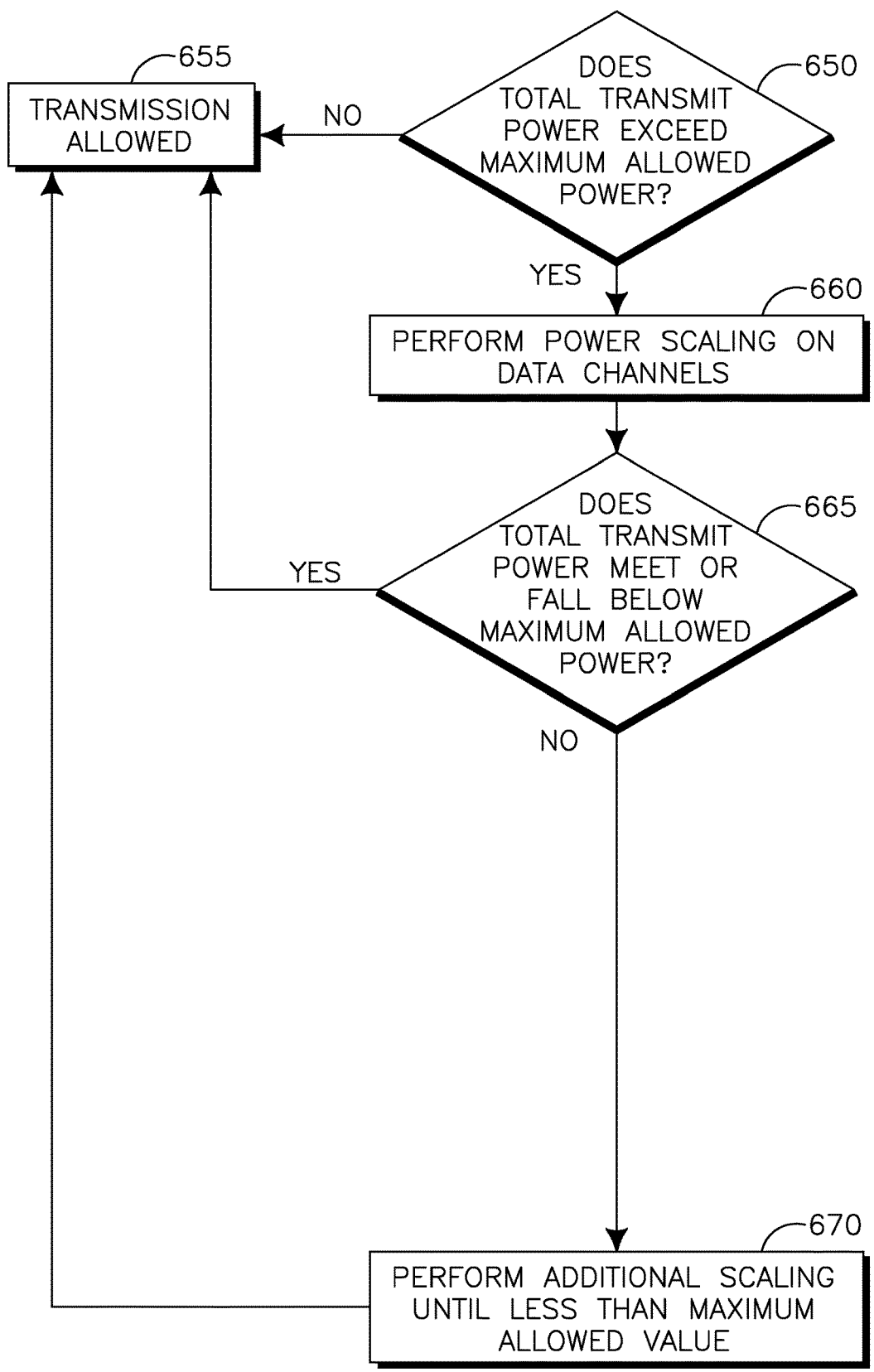
FIG. 6B shows another example flowchart for power scaling for multi-carrier WTRUs.

Alternatively, as shown in FIG. 6B, the WTRU may execute the following procedure. If the total WTRU transmit power (the WTRU transmit power may be correspond to the power after applying DPCCH power adjustments and gain factor, as an example), does not exceed the maximum allowed value (650) then transmission is allowed (655). If the total WTRU transmit power exceeds the maximum allowed value, then the WTRU performs power scaling on a group of channels (denoted as data channels in FIG. 6B) in accordance with a rule or criteria until the total WTRU transmit power no longer exceeds the maximum allowed value or minimum transit power levels are reached (660). The group of channels may include channels carrying user information (e.g., E-DCH) and optionally include associated control channels (e.g., E-DPCCH). If the total WTRU transmit power does not exceed the maximum power value (665), then transmission is allowed (655). If the total WTRU transmit power still exceeds the maximum allowed value (665), then the WTRU may need to perform additional power scaling (670). FIG. 6B is illustrative and the WTRU may perform power scaling in any order and in any combination.

The WTRU may perform one or more of the following methods, in any order or combination, and may repeat one or more of the following methods.

In one example method for performing power scaling on a data channel (e.g., 615 in FIG. 6), the WTRU may scale down the power of the E-DPDCH until the total WTRU transmit power no longer exceeds the maximum allowed value. In another example method, a minimum power scaling may be provided for the E-DPDCH of one or more carriers. In yet another example method, a minimum power scaling may be provided for the E-DPDCH of the anchor carrier (which may carry the signaling radio bearers (SRBs)) and no minimum power scaling may be applied to any of the supplementary carriers. For the minimum power scaling methods, the WTRU may receive the minimum power scaling configuration from the network via radio resource controller (RRC) signaling or higher layer signaling. In still another example, if different maximum power levels are set for each carrier, the WTRU may scale power on each of the carriers as described herein to the maximum power level for each of the carriers.

Power scaling on the data channel may be implemented using one or a combination of the example approaches described herein. In one example approach, the UL carriers may all be scaled equally. As an example of this first approach, the E-DPDCH power of all UL carriers are scaled equally until the total WTRU transmit power no longer exceeds the maximum allowed value or the minimum power has been reached on all the carriers. In another example of this approach, the PUSCH power of all carriers are scaled equally until the total WTRU transmit power no longer exceeds the maximum allowed value or the minimum power has been reached on all carriers.

In another example approach, the WTRU may first scale all UL supplementary carriers equally, and then scale the anchor carrier. As an example of this approach, the E-DPDCH power of all UL supplementary carriers are scaled equally until the total WTRU transmit power no longer exceeds the maximum allowed value or the minimum power has been reached on all the supplementary carriers. If the total WTRU transmit power still exceeds the maximum allowed value, then power scaling may be applied to anchor carrier's E-DPDCH. In another example of this approach, the PUSCH power of all UL supplementary carriers are scaled equally until the total WTRU transmit power no longer exceeds the maximum allowed value or the minimum power has been reached on all the supplementary carriers.

In another example approach, the WTRU may scale the power with a different weight on each carrier. In an example of this approach, the power of the E-DPDCH is scaled differently for each carrier. By applying a different weighting to each carrier, some carriers may be scaled more aggressively than others. The actual power scaling for each carrier then takes the form of a per-carrier weight combined with a common power scaling factor which may applied to more than one carrier. The per-carrier weights may be determined, for example, by using one or more of the techniques described herein, individually or in any combination.

In another example approach, the per-carrier weights are grant based. In this approach, the E-DPDCH per-carrier weights depend on the serving grant of each carrier. In another example technique, the per-carrier weights are pre-defined. In this technique, the E-DPDCH per-carrier weights depend on a configured or pre-configured set of weights. The predefined weights may be preset, configured by the network or signaled via the RRC or higher layers. In another example approach, the per-carrier weights depend on carrier identity or type (e.g., anchor versus supplementary). In this approach, the E-DPDCH per-carrier weights depend on the carrier type (anchor or supplementary). A configured or pre-defined set of per-carrier weights for power scaling of anchor and supplementary carrier or carriers may be used. These may be preset, configured by the network or signaled via the RRC or higher layers. In another example approach, the per-carrier weights may depend on the maximum power defined by the network for each carrier. The weights may also depend on any weighting methods in addition to the scaling rules based on the network defined per carrier maximum power.

In another example approach, the WTRU may scale one carrier at a time. As part of this approach, the power scaling may be applied to a data channel on a selected carrier until the WTRU transmit power no longer exceeds the maximum allowed value, or until the data channel minimum power is reached, or the power of the data channel is zero, in which case the data channel may optionally be in DTX mode. If the minimum power of the data channel is reached in the given carrier and additional scaling is required, the WTRU selects another carrier on which power scaling may be performed. When the WTRU transmit power no longer exceeds the maximum allowed value, the WTRU no longer needs to perform power scaling on the other carriers and the procedure is complete. In this approach, each carrier is processed successively (separately) for power scaling, and the order of processing may be determined using one or more of the techniques described herein, in any order or combination. As an example of this approach, the WTRU would start by reducing all the E-DPDCH gain factors on a selected carrier until the WTRU no longer exceeds the maximum power or is down to a minimum gain factor on this carrier. If further scaling is required (i.e., minimum gain factor has been reached on the selected carrier and additional scaling is required), the WTRU selects another carrier for reduction of its E-DPDCH gain factor (at most down to a minimum gain factor). The minimum gain factor may be pre-configured or signaled to the WTRU through higher layer signaling. The minimum gain factor may be defined per-carrier or a single value may be used for all carriers.

In another example approach, processing order may depend on anchor versus supplementary. In this technique, the power scaling may be first applied to the E-DPDCH transmitted on the supplementary carrier (without affecting the E-DPDCH on the anchor carrier). In case more than one supplementary carrier is configured, then the same power scaling may be applied to all supplementary carriers. Alternatively, a different power scaling may be applied. This may depend for instance on the grant or a pre-defined scaling weight as discussed herein. The power of the E-DPDCH on the anchor may not be scaled until the power from all supplementary carriers' E-DPDCH have been scaled down to zero, and the total WTRU transmit power still exceeds the maximum allowed power. In one alternative, the power of the E-DPDCH on the anchor may not be scaled until the power from all supplementary carriers' E-DPDCH have been scaled down to zero, and the power of the associated E-DPCCH have also been scaled down to zero, and the total WTRU transmit power still exceeds the maximum allowed power. In another alternative, the E-DPDCH on the anchor may not be scaled until all supplementary carriers are de-activated.

In another example approach, processing order may be predefined. In this technique, the power scaling may be first applied to the E-DPDCH transmitted on the anchor carrier. The power of the E-DPDCH on the supplementary carrier (or carriers) may not be scaled until the power from the anchor carrier's E-DPDCH has been scaled down to zero or to the minimum value configured, and the total WTRU transmit power still exceeds the maximum allowed power. Alternatively, the power of the E-DPDCH on the supplementary carrier (or carriers) may not be scaled until the power from the anchor carrier's E-DPDCH has been scaled down to zero or to the minimum value configured, the power of the associated E-DPCCH has also been scaled down to zero, and the total WTRU transmit power still exceeds the maximum allowed power.

In another example approach, the processing order may be pre-defined. In this approach, the order of processing carriers for power scaling is pre-defined or configured by the network. The WTRU processes each carrier successively. For each carrier, power scaling is applied to the E-DPDCH until the WTRU transmit power no longer exceeds the maximum allowed value, or until the E-DPDCH minimum power is reached, or the power of the E-DPDCH is zero in which case the E-DPCCH may optionally not be transmitted (or equivalently be in discontinuous transmission (DTX) mode). When the WTRU transmit power no longer exceeds the maximum allowed value, the WTRU no longer needs to perform power scaling on the other carriers and the procedure is complete.

In another example approach, the processing order may depend on a WTRU grant. In this technique, the order of power scaling carrier depends on the serving grant for each carrier. For example the power scaling may be applied to the carriers in increasing (or decreasing) order of serving grant. The WTRU processes each carrier successively. For each carrier, power scaling is applied to the E-DPDCH until the WTRU transmit power no longer exceeds the maximum allowed value, or until the E-DPDCH minimum power is reached, or the power of the E-DPDCH is zero in which case the E-DPCCH may optionally be in DTX mode. When the WTRU transmit power no longer exceeds the maximum allowed value, the WTRU no longer needs to perform power scaling on the other carriers and the procedure is complete.

In another example approach, the processing order may depend on a power metric (e.g., power headroom or power of UL reference or control channel) of each carrier. In this approach, the order of power scaling carrier depends on the power metric of each carrier. For example, the power scaling may be applied to the carriers in increasing (or decreasing) order of the power metric. The power metric may be the WTRU power headroom (UPH), for example calculated based on the maximum allowed power and DPCCH transmit power averaged over a short period (e.g.: 3 radio slots) or alternatively the power metric may be the conventional WTRU power headroom (UPH). Alternatively, the power metric may be defined as the DPCCH power over each carrier. As an example of this approach, the WTRU first selects and processes the carrier having the highest DPCCH power. Power scaling is then applied to the E-DPDCH until the WTRU transmit power no longer exceeds the maximum allowed value, or until the E-DPDCH minimum power is reached, or the power of the E-DPDCH is zero in which case the E-DPCCH may optionally be in DTX mode. When the WTRU transmit power no longer exceeds the maximum allowed value, the WTRU no longer needs to perform power scaling on the other carriers and the procedure is complete. If the WTRU transmit power still exceeds the maximum allowed value, the WTRU then selects the carrier having the next highest DPCCH power and repeats the procedure described above until the WTRU transmit power no longer exceeds the maximum allowed value or all carriers have been processed.

In another example approach, processing order depends on signaling radio bearers (SRBs). In this technique, the power scaling is first applied to the E-DPDCH transmitted on the carriers not configured to carry the SRBs. In case more than one such carrier is configured, then the same power scaling may be applied to all such carriers. Alternatively, a different power scaling may be applied to each carrier depending on, for example, the grant or a pre-defined scaling weight. The power of the E-DPDCH on the carrier carrying the SRB is not scaled until the power from all other carriers' E-DPDCH have been scaled down to zero, and optionally the power of the associated E-DPCCH have also been scaled down to zero, and the total WTRU transmit power still exceeds the maximum allowed power. Optionally, the E-DPDCH on the carrier carrying the SRB is not scaled until all supplementary carriers are de-activated.

In another example approach, processing order may depend on first transmission/retransmission. In this approach, the order of power scaling carrier may depend on whether the transmission is a first transmission or a hybrid automatic repeat request (HARQ) retransmission on each carrier. For example, the WTRU may apply power scaling first to the carrier for which the transmission is a first HARQ transmission. Alternatively, the WTRU may apply power scaling first to the carrier for which the transmission is a HARQ retransmission. The WTRU procedure is similar to the procedure described herein, but with the carrier order dependent whether or not the transmission is a first HARQ transmission or a HARQ retransmission. In case the status of both carriers is the same (e.g., both are first HARQ transmissions or HARQ retransmissions) then the order may depend on any of the other methods described herein. Described herein is power scaling on control channels as shown at (625), for example, in FIG. 6A. When both the E-DPDCH and E-DPCCH (i.e., the E-DCH) are discontinuously transmitted on a carrier not carrying the DPDCH or the HS-DPCCH, then further processing may be applied. This processing may be applied when the E-DPDCH has been scaled and the total WTRU power still exceeds the maximum allowed power, or optionally if the E-DPDCH power for a given carrier is scaled down to zero. In this instance, the WTRU may be configured to scale down DPCCH for that carrier until maximum power is reached or discontinuous mode may be applied to the DPCCH, effectively de-activating the carrier.

Described herein is additional scaling as shown as (635), for example, in FIG. 6A. When all supplementary carriers are de-activated and the total WTRU transmit power still exceeds the maximum allowed value, the WTRU may be configured to apply additional scaling to the remaining carrier (the one carrying the DPDCH) as in single-carrier operations.

If the total WTRU transmit power after power scaling according to any of the above methods is still above the maximum allowed value, the WTRU may apply the conventional additional scaling. More specifically, the additional scaling is applied such that for each carrier the power ratio between the DPCCH and the control channel remains and the power ratio between the reduced power E-DPDCH and the DPCCH also remains. The power ratio between DPCCH of each carrier remains constant.

Described herein are examples that include a subset of the procedures and rules described herein. In an example implementation, the additional power scaling on the DPCCH for the supplementary carriers is performed before scaling the E-DPDCH of the anchor carrier.

In another example implementation, the power scaling is first applied to the E-DPDCH transmitted on the supplementary carrier (without affecting the E-DPDCH on the anchor carrier). When the E-DPDCH has been scaled and the total WTRU power still exceeds the maximum allowed power, then the WTRU scales down DPCCH for that carrier until maximum power is reached. When all supplementary carriers are de-activated and the total WTRU transmit power still exceeds the maximum allowed value, the WTRU then applies additional scaling to the remaining carrier (the one carrying the DPDCH) as in single-carrier operations.

In another example implementation, power scaling is applied to one carrier at a time, as needed. Power scaling is initially applied to the data channel having the worst channel conditions, throughout or other similar power based or implied metric. The worst power metric may be determined by examining a control channel of the carriers. In general, the higher the power metric for a given control channel, the worse the channel conditions and the need for greater power to reach a target signal-to-noise (SNR) level, quality of service (QoS) or other service metric.

Figure 7:
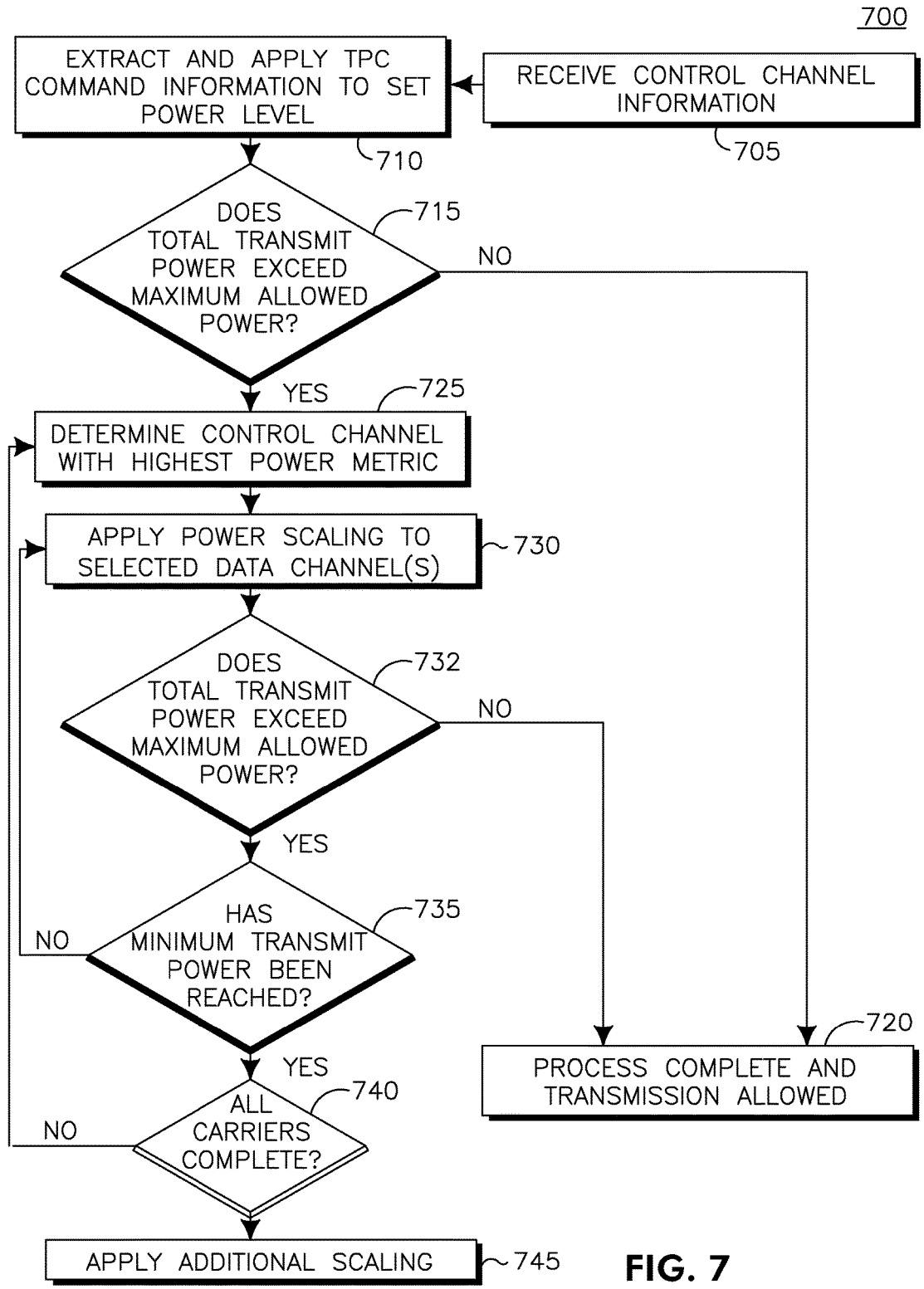
FIG. 7 shows another example flowchart for power scaling for multi-carrier WTRUs.

An illustrative flowchart 700 of this example implementation is shown in FIG. 7. A WTRU may receive control channel information from a base station (705). The control channel may be, for example, a DPCCH or an F-DPCH. Transmit power control (TPC) commands extracted from the control channel information are applied to set the power levels (710). The WTRU then determines if the total transmit power after applying the DPCCH power adjustments and gain factors is greater than the maximum allowed transmit power for the WTRU (715). If the total transmit power meets or is below the maximum allowed transmit power, then the process is complete and transmission may be allowed (720). If the total transmit power exceeds the maximum allowed transmit power, then the carrier with the highest DPCCH power or other similar power metric is determined (725). The WTRU then applies power scaling to the data channel, for example, but not limited to, the E-DPDCH, corresponding to the carrier with the highest DPCCH power (730).

Power scaling of the data channel may include scaling of only the data channel, e.g., the E-DPDCH, or additionally scaling of certain control channels that are associated with or specific to the data channel, e.g., E-DPDCH. As there may be multiple E-DPDCHs in the selected carrier, each E-DPDCH in the selected carrier may be reduced equally. Power scaling may be applied until the total transmit power meets or falls below the maximum allowed transmit power or reaches a minimum transmit power. The minimum transmit power for the E-DPDCH(s) may be predefined or configured by the network via higher layer signaling.

It is then determined if the total transmit power meets or falls below the maximum allowed transmit power (732), and, if so, then power scaling is complete and transmission may be allowed (720). If the total transmit power still exceeds the maximum allowed transmit power (732), then the WTRU determines if the minimum transmit power has been reached (735). If the minimum transmit power level has not been reached, then power scaling may still be applied (730). If the minimum transmit power has been reached, then determine if power scaling has been applied to all carriers (740). If it is determined that power scaling has not been applied to all carriers, then the WTRU determines the carrier with the next highest DPCCH or similar power metric (725) and repeats power scaling until transmission is allowed or power scaling has been applied to all active carriers. If the minimum transmit power of the data channels has been reached for all carriers (740), then additional scaling may be applied to all carriers (745). Additional scaling of the total transmit power reduces the power of all channels on a relative basis to maintain the power ratios between the data and control channels. Additional scaling may be applied until the total transmit power meets or falls below the maximum allowed transmit power.

Described herein is the impact on enhanced transport format combination (E-TFC). When configured for dual-carrier or multi-carrier operations, a WTRU has the potential to transmit two or more E-DCH transport blocks. In the standard E-TFC selection procedure, the WTRU determines a set of supported E-TFCs. These E-TFCs are allowed to be selected to carry data in the upcoming transmission time interval (TTI). To guarantee a minimum transmission rate, the WTRU may be configured with an E-DCH minimum set E-DCH transport format combination indicator (E-TFCI). All E-TFCIs smaller than or equal to this E-DCH minimum set E-TFCI, or equivalently all E-TFCs with corresponding E-TFCI smaller than or equal to this E-DCH minimum set E-TFCI are always considered supported by the E-TFC selection.

When two carriers are configured, a number of possible methods for E-TFC selection may be designed. In one possible set of E-TFC selection implementations, the WTRU may have a non-zero E-DCH minimum set E-TFCI configured per carrier. In this case, it may be possible for a WTRU (even under power-limited conditions), to generate two or more transport blocks (all of them with an E-TFCI equal to or below the E-DCH minimum set E-TFCI). This particular situation may be undesirable. In power-limited conditions it is likely that insufficient power may be allocated for the E-DCH to be received reliably.

To avoid the above situation when a WTRU is configured for dual-carrier or multi-carrier operations, the following set of rules are proposed, which may be used in any order and in any combination.

First, when power scaling is applied to any carrier, then the WTRU does not create any new E-DCH transport blocks for any carrier other than the anchor carrier. This results in the E-DPDCH and E-DPCCH not being transmitted on these carriers. This may be achieved, for example, by not performing E-TFC selection for any of the supplementary carriers when power scaling is being applied;

Second, when power scaling is being applied to any supplementary carrier, then the WTRU does not create any new E-DCH transport block for any carrier other than the anchor carrier. This results in the E-DPDCH and E-DPCCH not being transmitted on these carriers. This may be achieved, for example, by not performing E-TFC selection for any of the supplementary carriers when power scaling is being applied.

Third, when power scaling is applied to any carrier, the WTRU does not create any new E-DCH transport blocks. This may be achieved, for example, by not performing E-TFC selection at all when power scaling is being applied. This results in the E-DPDCH and E-DPCCH not being transmitted on any carrier.

With respect to the above described rules, power scaling being applied may refer to power scaling being applied during a pre-defined or configured number of slots. Alternatively, power scaling being applied may also refer to the total power scaling applied being larger than a pre-defined or configured value.

With respect to the above rules, when no E-DCH transport block has been transmitted on a carrier due to power limitation, the carrier may be deactivated (e.g., the WTRU may stop transmitting the associated DPCCH).

Described herein are power scaling mechanisms to reduce power imbalance between multiple carriers. For Dual Carrier-High-Speed Uplink Packet Access (DC-HSUPA), due to independent inner and outer loop power controls, different load and traffic on carriers, two carriers may be transmitted with large power imbalance. When this occurs, the signal-to-noise ratio (SNR) of the carrier with the smaller power may be deteriorated by the presence of the other carrier due to common Error Vector Magnitude (EVM) sources. In particular, any impairment leading to carrier leakage may decrease the SNR at the transmitter output. One possible outcome of such output signal degradation consists of a potentially significant degradation of the DPCCH SNR on the victim carrier, i.e., the lower power carrier. This signal degradation may be exacerbated when the output DPCCH power is low, such as when the WTRU is close to the Node-B. At the system-level, this may likely result in the Node-B sending transmit power command (TPC) up commands to increase the output DPCCH power, leading to an increase in noise rise, a loss of headroom for the WTRU and thus a reduction of the uplink capacity.

This signal degradation may be modeled as follows. Define the power of the transmitted DPCCH on the victim carrier as $P_{DPCCH}$, the adjacent carrier interference ratio as $G_{ACLR}$, the path gain to the Node-B as $G_{Path}$, the interference power plus noise level at the Node-B $P_{IN}$, the DPCCH signal-to-interference ratio (SIR) target at the Node-B as $SIR_{D,T}$, and the total power transmitted on the aggressor carrier as $P_{tot,a}$. The total adjacent carrier interference power may be given by the following:

$$P_{ACLR} = P_{tot,a} \times G_{ACLR}. \quad \text{Equation (1)}$$

The DPCCH signal-to-interference ratio (SIR) as measured at the Node-B, $SIR_{DPCCH}$, may be expressed as:

$$SIR_{DPCCH} = (P_{DPCCH} \times G_{Path})/(P_{ACLR} \times G_{Path} + P_{IN}). \quad \text{Equation (2)}$$

This shows that when a victim carrier suffers from adjacent carrier interference (due for example to a power imbalance) the SIR measured at the Node-B is reduced due to the reduction of SIR at the transmitter.

The ratio of DPCCH power to reach the same SIR target at a Node-B in the presence of inter-carrier interference and in the absence of inter-carrier interference may be expressed as:

$$\Delta P_{DPCCH} = (P_{ACLR} \times G_{Path} + P_{IN})/P_{IN} = 1 + (P_{ACLR} \times G_{Path})/P_{IN}. \quad \text{Equation (3)}$$

There are a number of different scenarios which may lead to power imbalance. In a first scenario, E-TFC selection is performed for two carriers. This scenario may occur when the WTRU has data to transmit and both carriers may transmit E-DCH data in the next TTI.

In a second scenario, E-TFC selection is performed for only one carrier. This scenario may occur when the WTRU has data to transmit, but only one of the two carriers is available for E-DCH transmission due to, for example, that the next HARQ process for one of the carriers may not be enabled or activated (from the L2 or L3 perspective). It may also be due to the fact that the next HARQ process for one of the carriers is in retransmission mode, the grant of the one carrier is zero or the medium access control (MAC) DTX is being applied to one of the carriers but not to the other carrier.

In a third scenario, no E-TFC selection is performed. This scenario may occur in a given slot when no E-DCH transmission is taking place and when control channels (e.g., the DPCCH and HS-DPCCH) are being transmitted over both carriers simultaneously. That is, both carriers are transmitting at least the DPCCH.

To alleviate this undesirable loss of signal quality at the transmitter caused by any of these scenarios, power scaling may be used to keep the power imbalance within a pre-defined range, reducing the undesirable decrease in output SNR on the victim carriers.

In one example of using power scaling to reduce power imbalance, a number of mechanisms are described where it may be assumed that a given power imbalance threshold value is configured at the WTRU. These mechanisms may be applicable in any order and in any combination.

The power imbalance threshold may be an indication of how much power difference may be tolerated between the two carriers. Alternatively, this power imbalance threshold may be an indication of how much power difference may be tolerated between one carrier and a given channel (e.g., DPCCH or PUCCH) on a victim carrier. This threshold value may also be calculated by the WTRU, and may depend on one or more parameters and in any combination. The parameters may include, but are not limited to, for example, the WTRU DPCCH transmission power, the total WTRU transmission power (as per its category or as configured by the network), the total power transmitted (e.g., over the last TTI, averaged over the last three slots or averaged over a pre-defined time interval), the common pilot channel (CPICH) power as measured by the WTRU, the path loss estimated by the WTRU from knowledge of the absolute CPICH power or other means, an offset or threshold value configured by the network and received by the WTRU via RRC signaling, and a pre-defined offset or threshold value pre-defined in the standards specifications.

A value for this threshold may be prescribed by the specifications, and the WTRU may be preconfigured with this value. Alternatively, the network may signal this value via RRC signaling, for example as part of a reconfiguration message for dual-carrier or multi-carrier uplink operations. The mechanisms described may also be applicable even if the signification of this threshold value is different.

In this method, the WTRU may be configured to scale the power for each carrier to maintain the power imbalance equal to or below a threshold. This threshold may be calculated by the WTRU, configured by the network (in which case the WTRU has to first receive the configuration via RRC signaling) or pre-defined in the specifications.

The WTRU may calculate the total power transmitted over each carrier. For example, the total transmitted power on the anchor carrier may be calculated as follows:

$$P_{tot1} = P_{DPCCH,1} + P_{HS-DPCCH} + P_{E-DPCCH,1} + P_{E-DPDCH,1}; \text{ and} \quad \text{Equation (4)}$$

$$P_{tot2} = P_{DPCCH,2} + P_{E-DPCCH,2} + P_{E-DPDCH,2} \quad \text{Equation (5)}$$

where $P_{DPCCH,k}$, $P_{E-DPCCH,k}$ and $P_{E-DPDCH,k}$ are the DPCCH, E-DPCCH and E-DPDCH powers transmitted over carrier index k=1,2, respectively. $P_{HS-DPCCH}$ is the power of the HS-DPCCH (transmitted over carrier 1, although it may be transmitted over more than one carrier).

If the difference between $P_{tot1}$ and $P_{tot2}$ is larger than a certain threshold, that is if:

$$|P_{tot1} - P_{tot2}| > P_{Th}; \quad \text{Equation (6)}$$

then power scaling is applied to reduce the total imbalance equal to or below the threshold value $P_{Th}$. Alternatively, the power imbalance may be expressed as $|P_{tot1} - P_{tot2}| \geq P$.

Power scaling may be applied to the carrier with the largest transmission power. For the purpose of this description, it may be assumed without loss of generality that the first carrier has the largest power such that $P_{tot1} - P_{tot2} > P_{Th}$ holds.

In this case, the WTRU applies power scaling to the E-DPDCH on carrier 1 such that $P_{E-DPDCH,1}$ is reduced. The power reduction is achieved by reducing the value of the E-DPDCH gain factor for the first carrier until the power difference is smaller (or smaller than or equal to) the threshold, that is $P_{tot1} - P_{tot2} < P_{Th}$ (or $P_{tot1} - P_{tot2} \leq P_{Th}$), or until the minimum value of the gain factor is reached. Optionally, a special minimum value of the gain factor is configured for use with power imbalance power scaling only. Optionally, in case the gain factor of the E-DPDCH before scaling is already below the minimum value configured, no scaling may be applied to that carrier.

If, after this E-DPDCH power scaling, the power difference is still larger than (or larger than or equal to) the threshold, additional power scaling may be applied. In a more explicit form, it is assumed that $P_{tot1}$ was reduced to $P_{tot1}'$ by the power scaling. Then in this situation, $P_{tot1}' - P_{tot2} < P_{Th}$ still holds and additional power scaling is required.

The additional power scaling may consist of one or more approaches. In one approach, the WTRU may apply equal power reduction to all the channels carried over the first carrier. In another example approach, the WTRU may increase power on the second carrier using one or more methods. In another example approach, the WTRU may increase the power of the DPCCH on the second carrier. In another example approach, the WTRU may increase the power of the E-DPDCH on the secondary carrier (that is, beyond what is prescribed by the selected transport block size). In another example approach, the WTRU may apply equal power increase to all the channels carried over the second carrier. In another example approach, the WTRU may increase the power of the control channels only on the second carrier when the maximum transmit power is not exceeded.

In one example embodiment of additional power scaling, the WTRU may calculate the power imbalance that needs to be compensated for by additional power scaling. For example, the WTRU may calculate the additional power that needs to be reduced, $P_{add}$, by using the following:

$$P_{add} = P_{tot1}' - P_{tot2} - P_{Th}.\qquad\text{Equation (7)}$$

The WTRU may then reduce the power of the first carrier by that amount (or slightly more depending on the quantization levels to ensure that the resulting power difference meets or is below the threshold) via power scaling. This may be achieved, for example, by scaling all channels of that carrier by the same scaling factor.

In another example embodiment, the WTRU may calculate the difference in power between the total transmitted power on one carrier and the power of the DPCCH on the other carrier. A power imbalance is detected when for at least one of the power difference is larger than a threshold. In more particular terms, the WTRU calculates the difference between the total power in carrier 1 and the DPCCH power in carrier 2 and between the total power in carrier 2 and the DPCCH power in carrier 1:

$$P_{12} = P_{tot1} - P_{DPCCH,2};\qquad\text{Equation (8)}$$

$$P_{21} = P_{tot2} - P_{DPCCH,1};\qquad\text{Equation (9)}$$

where $P_{tot1}$, $P_{tot2}$, $P_{DPCCH1}$ and $P_{DPCCH2}$ are defined above. The WTRU may then verify if a power imbalance condition occurs. This may be achieved by comparing $P_{12}$ and $P_{21}$ to a threshold such that if $P_{12} > P_{Th}$ or $P_{21} > P_{Th}$ then a power imbalance condition exists. For example, if $P_{12} > P_{Th}$, then carrier 1 interferes with carrier 2 and carrier 1 is the aggressor and carrier 2 the victim.

One consequence of such power imbalance is that one carrier interferes with the other carrier at the transmitter. This results in a lower DPCCH SNR at the Node-B, which in turn may request the WTRU to raise its DPCCH power on that victim carrier. This results in lower headroom for the WTRU and ultimately a loss of capacity on the uplink.

In one example method, to reduce the impact of such a power imbalance, the WTRU may reduce the power of the aggressor carrier such that the power difference meets or is below the threshold. In this method, the WTRU may receive a configuration message (e.g., via RRC signaling) containing parameters related to the calculation of the amount of power reduction. Such parameters may include, for example, one or more of a threshold value, a power offset, an interference power level, and a path loss measurement. The WTRU may then calculate the power reduction based on a combination of one or more elements. For example, the WTRU may use the DPCCH power transmitted on the victim carrier. In another example method, it may use an estimate of the path loss (e.g., obtained using existing measurements). In another example method, it may use one or more parameters transmitted by the network (such as threshold value, a power offset, an interference power level, an interference plus noise power level or a path loss measurement). In another example method, it may use the total power transmitted on the aggressor carrier. In another example method, it may use a carrier leakage parameter, which may be WTRU-specific, fixed by the specifications or configured by the network via RRC signaling.

In an example embodiment, if carrier 1 is the aggressor and $P_{tot1}$ is the total power transmitted over the carrier 1, and if the carrier leakage ratio is $G_{ACLR}$, the path gain is $G_{Path}$, the interference power plus noise level at the Node-B is $P_{IN}$, and the threshold value is Th, then using the second term in equation (3), the WTRU may calculate a power reduction factor $\alpha$ for the aggressor carrier such that the following equation is respected:

$$\alpha P_{tot1} < (Th \times P_{IN})/(G_{ACLR} \times G_{Path})\qquad\text{Equation (10)}$$

This WTRU-calculated power reduction may be applied to the E-DPDCH only on the aggressor carrier. The WTRU may not apply this power reduction to reduce the power of the E-DPDCH further than the minimum value allowed by the conventional power scaling procedure. Alternatively, the WTRU may apply this power reduction equally to all channels on the aggressor carrier.

In another example method, the WTRU may apply a fixed power reduction to the aggressor carrier E-DPDCH when a power imbalance condition is detected. The WTRU may receive the value of the fixed power reduction factor via RRC signaling. Alternatively, the WTRU may use a power reduction factor specified by the standards.

In another example method, the WTRU may raise the power of the DPCCH on the victim carrier when it detects the power imbalance condition. This may potentially avoid delays in raising the DPCCH power to the target level due to the power control latency and limited DPCCH power increase step size. This may be achieved, for example, by the following method. The WTRU may calculate the power offset to be added to the DPCCH on the victim carrier in a similar way as described above for calculating the power reduction factor. For example, the DPCCH power factor applied to the victim carrier, $\varphi$, may be calculated via the following formulation:

$$\varphi = 1 + (P_{tot1} \times G_{ACLR} \times G_{Path})/P_{IN}\qquad\text{Equation (11)}$$

In another example approach, a fixed power factor may be applied to DPCCH of the victim carrier when a power imbalance condition is detected. The WTRU may receive this power factor via RRC signaling. Alternatively, the WTRU may use a power factor specified by the standards.

In another example approach, the WTRU may be power-limited when a power imbalance condition occurs. In such cases, the WTRU may reduce the power of the E-DPDCH on the aggressor carrier thereby liberating part of the power for the victim carrier, which it may use to properly send its data information. Thus, the power adjustment for power imbalance may be performed in this case before the conventional power scaling procedure. Optionally, on the network side, a Radio Network Controller (RNC) may configure the Node-B with a different DPCCH SIR target when the WTRU is operating with dual-carrier. The Node-B may use this value when the supplementary carrier is activated and revert to the single-carrier DPCCH SIR target when the supplementary carrier is de-activated. This different DPCCH SIR target may be signaled by the RNC by means of a SIR offset which is applied to the DPCCH SIR target at the Node-B for a given WTRU when its supplementary carrier is activated.

Described herein are methods when the WTRU detects a power imbalance and notifies the network. In one example embodiment, the WTRU may detect a power imbalance condition and signal it to the network. To declare that a power imbalance condition exists, the WTRU may compare the power difference between the total power transmitted on the first carrier and the total power transmitted on the second carrier to a threshold value. Alternatively, the WTRU may compare a power difference (between the total power transmitted on one carrier and the DPCCH power transmitted on the other carrier) to a threshold value and vice versa. The WTRU may perform these operations every radio slot or every TTI. If any of the power differences are above the threshold, the WTRU notifies this condition to the network. Optionally, the WTRU may count the number of successive radio slots (or TTI) for which the power imbalance condition is detected. The count may be reset every slot (or TTI) where the power imbalance condition is not detected. When the count reaches a certain value, the WTRU may notify the power imbalance condition to the network. Alternatively, the WTRU may count the number of radio slots (or TTI) for which the power imbalance condition is detected during a configured period of time (sliding window). When the count is above a configured threshold, the WTRU notifies the network that a power imbalance condition has been detected. For example, when the WTRU counts N or more power imbalance events in the last M TTIs, then the WTRU notifies the network.

The notification may be sent via a new field in the MAC-i or MAC-e header as it terminates at the Node-B. Alternatively, the WTRU may send an RRC message to the network indicating the conditions. This RRC message may be a measurement report. In another alternative, the WTRU may send the information via system information (SI) in which case detection of the power imbalance situation acts as a trigger for sending an SI. The information may be carried, for instance, in one of the unused bits in the SI for the secondary carrier. Alternatively, a new field is introduced in the SI or some combinations of bits are re-interpreted.

In another example embodiment, assuming the existing Adjacent Channel Leakage Ratio (ACLR) requirements for single carrier are maintained for dual carrier HSUPA, a total transmission power based method may be used to handle the maximum power different between carriers. In this embodiment, when the total transmission power does not exceed the WTRU maximum power, then the inner and outer loop power control mechanism handles the power imbalance. And when the total transmission power exceeds the WTRU maximum power, the power reduction and power scaling and corresponding E-TFC methods as described herein are selected to handle it.

For DC-HSUPA, the WTRU may share its total power over two carriers during dual carrier operation. There are potential sources of nonlinearity in the front end, which may include power amplifier, mixer, and other components, depending on the implementation. Generally speaking, compared to single carrier HSUPA, the SNR of DC-HSUPA degrades not only because dual carriers share the total power, but also because dual carriers modulate each other and contribute to ACLR. The ACLR may be increased as a particular hardware configuration is alternately driven by a multi or dual carrier signal and by a single carrier signal with the same total power. Therefore, when the maximum power difference in dual carriers occurs, there is a potentially significant degradation of the DPCCH SNR on the victim carrier due to the big spectral leakage from the aggressor carrier. In order to avoid this, the acceptable ACLR like the existing ACLR requirements for single carrier need to be maintained for DC-HSUPA.

As part of this embodiment, the Node-B (UTRAN) may be configured to resolve the power imbalance issue by ensuring that the difference in UL DPCCH received power on the two carriers lies within a given threshold for a given WTRU by using the existing power control mechanism (i.e., via DL TPC commands sent over Fractional Dedicated Physical Channel (F-DCPH)). This threshold may be pre-configured or signaled to Node-B by the RNC.

An example realization to maintain the UL DPCCH received power difference between the two carriers below a given threshold is described herein. When the difference in UL DPCCH received power of the dual-carrier is bigger than the given threshold, the Node-B compares the estimated DPCCH SIR of victim carrier to its DPCCH SIR target plus the offset and generates TPC commands. This may result in the possibility of increasing the DPCCH power of the victim carrier and decrease the power imbalance between the dual-carrier. When the difference in UL DPCCH received power of the dual-carrier is no more than the given threshold, the conventional power control may be run independently on each carrier, i.e., without offsetting the DPCCH SIR target. For example, let: 1) SIRTarget1 and SIRTarget2 represent the SIR targets configured for each carrier (note that a single SIRTarget may be configured, in which case SIRTarget1=SIRTarget 2); 2) Rx1 and Rx2 represent the measured UL DPCCH received power for carrier 1 and carrier 2, respectively; 3) MAX_DPCCH_DELTA represent the maximum desired difference between Rx1 and Rx2; and 4) TARGET_OFFSET represent the offset used to adjust the SIRTarget1 or SIRTarget2 given by the higher layer.

Then, the proposed two independent inner loop power control method for dual carriers may take the following form shown in Table 1.

TABLE 1 a. If (Rx1 − Rx2 > MAX_DPCCH_DELTA)
    i. SIRTarget1_current = SIRTarget1
    ii. SIRTarget2_current = SIRTarget2+ TARGET_OFFSET
    iii. If (SIR1 < SIRTarget1_current)
        1. Then TPC1 is set to UP
    iv. Else TPC1 is set to down
    v. If (SIR2 < SIRTarget2_current)
        1. Then TPC2 is set to UP
    vi. Else TPC2 is set to down
b. Else if (Rx2 − Rx1 > MAX_DPCCH_DELTA)
    i. SIRTarget1_current = SIRTarget1 + TARGET_OFFSET
    ii. SIRTarget2_current = SIRTarget2
    iii. If (SIR1 < SIRTarget1_current)
    iv. Then TPC1 is set to UP
    v. Else TPC1 is set to down
    vi. If (SIR2 < SIRTarget2_current)
    vii. Then TPC2 is set to UP
    viii. Else TPC2 is set to down
c. Else
    i. SIRTarget1_current = SIRTarget1
    ii. SIRTarget2_current = SIRTarget2
    iii. If (SIR1 < SIRTarget1_current)
        1. Then TPC1 is set to UP
    iv. Else TPC1 is set to down
    v. If (SIR2 < SIRTarget2_current)
        1. Then TPC2 is set to UP
    vi. Else TPC2 is set to down.

The inner loop power control method shown in Table 1 for dual carriers may ensure the difference in UL DPCCH received power on the two carriers lies within a given threshold while meeting the SIRtarget qualities on both carriers. The method may be modified to achieve the same goal by reducing the SIRtarget of the aggressor carrier, which may not be favorable from a quality of service (QoS) perspective.

In another example realization of a joint UL dual carrier inner loop power control method, let: 1) SIR1 and SIR2 denote the measured SIR levels on carriers 1 and 2 respectively; 2) SIRTarget1 and SIRTarget2 represent the SIR targets configured for each carrier (note that a single SIRTarget may be configured, in which case SIRTarget1=SIRTarget 2); 3) Rx1 and Rx2 represent the measured UL DPCCH received power for carrier 1 and carrier 2, respectively; 4) StepSize represent the increase/decrease in power that is apply by the WTRU following an UP or DOWN command by the Node-B; 5) TPC1 and TPC2 represent the UP/DOWN TPC commands that the Node-B generated for carrier 1 and carrier 2. TPC1 and TPC2 are the output of the joint inner loop power control method; and 6) MAX_DPCCH_DELTA represent the maximum desired difference between Rx1 and Rx2.

Then, the jointly determined inner loop power control commands may be derived as shown in Table 2.

TABLE 2 a. If (SIR1 < SIRTarget 1) and (SIR2 < SIRTarget2)
   i. Then TPC1 is set to UP and TPC2 is set to UP
b. Else If (SIR1 < SIRTarget 1) and (SIR2 > SIRTarget2)
   i. If (Rx1 < Rx2),
      1. Then TPC1 is set to UP and TPC2 is set to DOWN
   ii. Else (i.e. Rx1 > Rx2)
      1. If (Rx1 − Rx2 + 2*StepSize) < MAX_DPCCH_DELTA
         a. Then TPC1 is set to UP and TPC2 is set to DOWN
      2. Else
         a. TPC1 is set to UP and TPC2 is set to UP
c. Else If (SIR1 > SIRTarget 1) and (SIR2 < SIRTarget2)
   i. If (Rx1 > Rx2),
      1. Then TPC1 is set to DOWN and TPC2 is set to UP
   ii. Else (i.e. Rx1 < Rx2)
      1. If (Rx2 − Rx1 + 2*StepSize) < MAX_DPCCH_DELTA
         a. Then TPC1 is set to DOWN and TPC2 is set to UP
      2. Else
         a. TPC1 is set to UP and TPC2 is set to UP
d. Else If (SIR1 > SIRTarget 1) and (SIR2 > SIRTarget2)
   i. Then TPC1 is set to DOWN and TPC2 is set to DOWN.

This example method prioritizes reaching the SIRtarget quality on each carrier over meeting the maximum difference in power per carrier. The method may be modified to reach the maximum carrier power difference more quickly at the expense of not meeting the SIRtarget on one or both carriers.

Optionally, the Node-B may want to ensure the difference in the total received power (including E-DPDCH, E-DPCCH and/or HS-SCCH) on each carrier for a given WTRU is within a predetermined threshold. In one example embodiment, the Node-B may apply the UL DPCCH receive power matching method and ensure that the difference in scheduling grants provided for each carrier lies within a certain threshold. In an alternative embodiment, the Node-B may determine the inner loop power control commands for UL DPCCH independently for each carrier (e.g., by simply comparing the received SIR to the target SIR on each carrier), and determine scheduling grants jointly across the two carriers by ensuring that the difference in total receive power from the WTRU on both carriers, assuming scheduling grants are fully utilized, lies within a predetermined threshold.

In all cases, the maximum power difference thresholds may be pre-configured (i.e., pre-defined "hard" values) or configured by the RNC through signaling over the Iub interface.

Described herein is multi-mode power scaling. During radio-link establishment of a secondary UL carrier, the WTRU may transmit the DPCCH with power determined by the TPC commands received on the associated downlink F-DPCH. Concerns related to potential unlimited DPCCH ramp-up due to radio-link synchronization failures at the Node-B have been raised, where a power-limit imposed on the DPCCH power of the secondary carrier was suggested as a means to resolve the issue.

Accordingly, a multi-mode power scaling approach is described herein. Although this multi-mode power scaling approach is proposed in the context of DC-HSUPA, it is applicable to other technologies.

The example multi-mode power scaling method consists of two or more power scaling modes: 1) one or more triggers to alternate power scaling mode; and 2) a set of rules dictating how the power scaling mode changes with respect to possible triggers.

The power scaling mode may consist, for instance, of any of the power scaling methods described herein or in other documents such as the 3GPP specifications. The WTRU may obtain the set of triggers and rules from the specifications or receive the set of triggers and rules via a configuration message by the network (e.g., via RRC signaling).

When the WTRU operates in one of the power scaling modes, it may receive a trigger to change the power scaling mode. The WTRU may change the power scaling mode at the time determined by the rules and start applying power scaling according to the new mode.

In a first example, the first power scaling mode consists of scaling power of the secondary carrier first. The second power scaling mode consists of scaling the power of the carrier with the largest DPCCH power first. The trigger and rules may be defined as: 1) upon secondary carrier activation, the WTRU may use the first power scaling mode; and 2) after a timer has expired, the WTRU may use the second power scaling mode.

The timer may be pre-configured in the specifications or the WTRU may receive its value via RRC signaling. The WTRU may start the timer when the WTRU starts UL transmission, or some time afterwards, for example, when the higher layers consider the downlink physical channel established.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit/receive unit (WTRU) comprising:
a processor configured to determine transmission power levels for a plurality of uplink channels of a plurality of uplink component carriers, wherein the plurality of uplink channels include a physical uplink shared channel (PUSCH) and a physical uplink control channel (PUCCH), wherein the plurality of uplink component carriers include a primary component carrier and a secondary component carrier;
wherein, on a condition that a maximum transmission power level is exceeded, one or more transmission power levels of the plurality of uplink channels are scaled;
wherein a transmission power level of a PUSCH transmission without control data is scaled before a PUSCH transmission with control data and the PUSCH transmission without control data is scaled before a PUCCH transmission with control data;
wherein the secondary component carrier is scaled before the primary component carrier; and
a transmitter configured to transmit on the plurality of uplink channels at the determined transmission power levels.

2. The WTRU of claim 1, wherein the PUCCH is transmitted on the primary component carrier.

3. The WTRU of claim 2, wherein a transmission power level of the PUCCH is not scaled on the condition that an uplink maximum transmission power level is exceeded by a total WTRU transmit power.

4. A method performed by a wireless transmit/receive unit (WTRU), the method comprising:
determining, by the WTRU, transmission power levels for a plurality of uplink channels of a plurality of uplink component carriers, wherein the plurality of uplink channels include a physical uplink shared channel (PUSCH) and a physical uplink control channel (PUCCH), wherein the plurality of uplink component carriers include a primary component carrier and a secondary component carrier;
wherein, on a condition that a maximum transmission power level is exceeded, one or more transmission power levels of the plurality of uplink channels are scaled;
wherein a transmission power level of a PUSCH transmission without control data is scaled before a PUSCH transmission with control data and the PUSCH transmission without control data is scaled before a PUCCH transmission with control data;
wherein the secondary component carrier is scaled before the primary component carrier; and
transmitting, by the WTRU, on the plurality of uplink channels at the determined transmission power levels.

5. The method of claim 4, wherein the PUCCH is transmitted on the primary component carrier.

6. The method of claim 5, wherein a transmission power level of the PUCCH is not scaled on the condition that an uplink maximum transmission power level is exceeded by a total WTRU transmit power.

* * * * *